United States Patent
Sawada

(10) Patent No.: US 8,807,639 B2
(45) Date of Patent: Aug. 19, 2014

(54) ROOF APPARATUS

(71) Applicant: Aisin Seiki Kabushiki Kaisha, Kariya (JP)

(72) Inventor: Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/888,404

(22) Filed: May 7, 2013

(65) Prior Publication Data

US 2013/0307296 A1    Nov. 21, 2013

(30) Foreign Application Priority Data

May 17, 2012 (JP) ................................ 2012-113398

(51) Int. Cl.
 *B60J 10/12* (2006.01)
 *B60J 7/043* (2006.01)
 *B60J 7/047* (2006.01)

(52) U.S. Cl.
 CPC ............. *B60J 10/12* (2013.01); *B60J 7/0435* (2013.01)
 USPC .............................. 296/216.06; 296/216.08

(58) Field of Classification Search
 CPC ........... B60J 10/12; B60J 7/043; B60J 7/0435
 USPC .......................................... 296/216.01–224
 See application file for complete search history.

(56) References Cited

U.S. PATENT DOCUMENTS

| 5,988,736 | A | * | 11/1999 | Kralik et al. | ............. 296/216.06 |
| 6,364,407 | B1 | * | 4/2002 | Raisch et al. | ............. 296/216.06 |
| 6,932,422 | B2 | | 8/2005 | Ota et al. | |
| 8,333,427 | B2 | | 12/2012 | Sawada | |
| 2007/0228779 | A1 | | 10/2007 | Stallfort | |
| 2012/0112498 | A1 | | 5/2012 | Kikuchi et al. | |

FOREIGN PATENT DOCUMENTS

| EP | 2 078 630 B1 | 7/2009 |
| JP | 7-117582 | 5/1995 |

OTHER PUBLICATIONS

K. Sawada, "Roof Apparatus," U.S. Appl. No. 13/890,295, filed May 9, 2013.

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A roof apparatus includes a weather strip including a portion to be retained, and first and second seal portions which are connected to an upper end of the portion to be retained. A thickness of the first seal portion gradually reduces from a first end portion positioned at an upper end side of the portion to be retained towards a first turned back portion, and gradually increases from the first turned back portion towards a second end portion provided at a lower end portion of the portion to be retained. A thickness of the second end portion is smaller than that of the first end portion. A distance in a vehicle height direction from a lower end of the first seal portion to the first turned back portion is greater than a distance from an upper end of the first seal portion to the first turned back portion.

8 Claims, 8 Drawing Sheets

ROOF APPARATUS

CROSS REFERENCE TO RELATED APPLICATIONS

This application is based on and claims priority under 35 U.S.C. §119 to Japanese Patent Application 2012-113398, filed on May 17, 2012, the entire content of which is incorporated herein by reference.

TECHNICAL FIELD

This disclosure generally relates to a roof apparatus.

BACKGROUND DISCUSSION

A known roof apparatus which includes a movable panel for opening and closing an opening portion formed on a roof portion of a vehicle is disclosed in US2007/228779A. As shown in FIG. 12, the roof apparatus includes a movable panel 102 for opening and closing an opening portion 101 formed on a roof portion 100 of a vehicle, and a guide rail 103 provided at a rim portion of the opening portion 101 in a vehicle width direction and extends in a front-rear direction of the vehicle (i.e., a direction perpendicular to a drawing in FIG. 12). A link member 104 connected to a rim portion of the movable panel 102 in the vehicle width direction is rotatably connected to the guide rail 103. The roof apparatus is configured to transit to a tilted-up state, for example, by raising a rear portion of the movable panel 102 with a front portion of the movable panel 102 as a rotation center in response to a rotation of the link member 104.

The guide rail 103 includes a vertical wall portion 103a provided to extend in an upward direction at a clearance C1 formed between an opening end 101a formed in a flange shape at the opening portion 101 and a rim end of the movable panel 102 in a vehicle width direction when the movable panel 102 is in a closed state. A weather strip 106 extending in a front-rear direction of the vehicle and having an approximately constant cross section is attached to the vertical wall portion 103a. The weather strip 106 includes a first seal portion 107 formed in an approximately D-shape in a cross section which liquid-tightly contacts a rim end of the movable panel 102 in the vehicle width direction, and a second seal portion 108 formed in an approximately tongue piece shape in cross section which liquid-tightly contacts the opening end 101a. Thus, the weather strip 106 prevents infiltration of a droplet or raindrops via the clearance C100.

In those circumstances, the link member 104 is positioned within a range of the clearance C100 in a vehicle width direction and protrudes above the opening portion 101 through the clearance C100 when the rear portion of the movable panel 102 is raised. Further, in a state where the movable panel 102 is fully closed, the link member 104 is positioned under the weather strip 106 (first seal portion 107). That is, the first seal portion 107 of the weather strip 106 elastically deforms so as to allow an up-down operation of the link member 104 through the clearance C100.

Notwithstanding, the first seal portion 107 is generally thick and has a configuration that unlikely deflects in an upward direction in response to, for example, a rising operation of the link member 104. Thus, repeating unstable elastic deformation of the first seal portion 107 may shorten a lifetime of the weather strip 106.

A need thus exists for a roof apparatus which is not susceptible to the drawback mentioned above.

SUMMARY

In light of the foregoing, the disclosure provides a roof apparatus which includes a movable panel moving upward and downward relative to an opening portion formed on a roof portion of a vehicle for opening and closing the opening portion, a weather strip retained at a retaining member provided at the roof portion, and a cooperating member moving upward and downward in a vehicle height direction in response to an upward and downward operation of the movable panel to protrude and retract through a clearance between a peripheral rim end of the movable panel and the retaining member, the weather strip including a portion to be retained being retained by the retaining member, a first seal portion which is connected to an upper end of the portion to be retained and liquid-tightly contacts the peripheral rim end of the movable panel in a state where the movable panel is in a fully closed state, and a second seal portion which is connected to an upper end of the portion to be retained and liquid-tightly contacts an opening end of the opening portion in the state where the movable panel is in the fully closed state. The first seal portion is connected to a lower end portion of the portion to be retained, a thickness of the first seal portion gradually reduces from a first end portion positioned at an upper end side of the portion to be retained towards a first turned back portion provided facing the peripheral rim end of the movable panel, the thickness of the first seal portion gradually increases from the first turned back portion towards a second end portion provided at a lower end portion of the portion to be retained, a thickness of the second end portion is set to be smaller than a thickness of the first end portion, and a distance in a vehicle height direction from a lower end of the first seal portion to the first turned back portion is set to be greater than a distance in the vehicle height direction from an upper end of the first seal portion to the first turned back portion.

According to another aspect of the disclosure, a roof apparatus includes a movable panel moving upward and downward relative to an opening portion formed on a roof portion of a vehicle for opening and closing the opening portion, and a weather strip retained at a retaining member provided at the roof portion, a cooperating member moving upward and downward in a vehicle height direction in response to an upward and downward operation of the movable panel to protrude and retract through a clearance between a peripheral rim end of the movable panel and the retaining member, the weather strip including a portion to be retained being retained by the retaining member, a first seal portion which is connected to an upper end of the portion to be retained and liquid-tightly contacts the peripheral rim end of the movable panel in a state where the movable panel is in a fully closed state, and a second seal portion which is connected to an upper end of the portion to be retained and liquid-tightly contacts an opening end of the opening portion in the state where the movable panel is in the fully closed state. The first seal portion is connected to a lower end portion of the portion to be retained, a thickness of the first seal portion gradually reduces from a first end portion positioned at an upper end side of the portion to be retained towards a first turned back portion provided facing the peripheral rim end of the movable panel, the thickness of the first seal portion gradually increases from the first turned back portion towards a second end portion provided at a lower end portion of the portion to be retained, a thickness of the second end portion is set to be smaller than a thickness of the first end portion, and a distance in a vehicle height direction from a lower end of the first seal portion to the first turned back portion is set to be greater than a distance in the vehicle height direction from an upper end of the first seal portion to the first turned back portion. The second seal portion is connected to a lower end of the portion to be retained, a thickness of the second seal portion reduces from a third end portion provided at an upper end of the portion to be retained towards a second turned back portion provided facing the opening end of the opening portion, a thickness of a fourth end portion provided at a lower end of the portion to be retained is set to be smaller than a thickness of the third end portion, a distance in a height direction from a lower end of the second seal portion to the second turned back portion is set to be greater than a distance in a height direction from an upper end of the second seal portion to the second turned back portion. The first turned back portion is positioned at a level higher than the second turned back portion in a vehicle height direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

One embodiment of a roof apparatus will be explained with reference to FIGS. 1 to 10 as follows. Hereinafter, directions such as front, rear, upward, downward, inner, outer, or the like correspond to an orientation of a vehicle. That is, a front-rear direction corresponds to a front-rear direction of the vehicle, and an upward and a downward correspond to an upward and a downward in a vehicle height direction, respectively. Further, a vehicle inner side corresponds to the inner in a vehicle width direction directed to an inside of a vehicle compartment, and a vehicle outer side corresponds to the outer in the vehicle width direction directed to an outside of the vehicle compartment.

Figure 1:
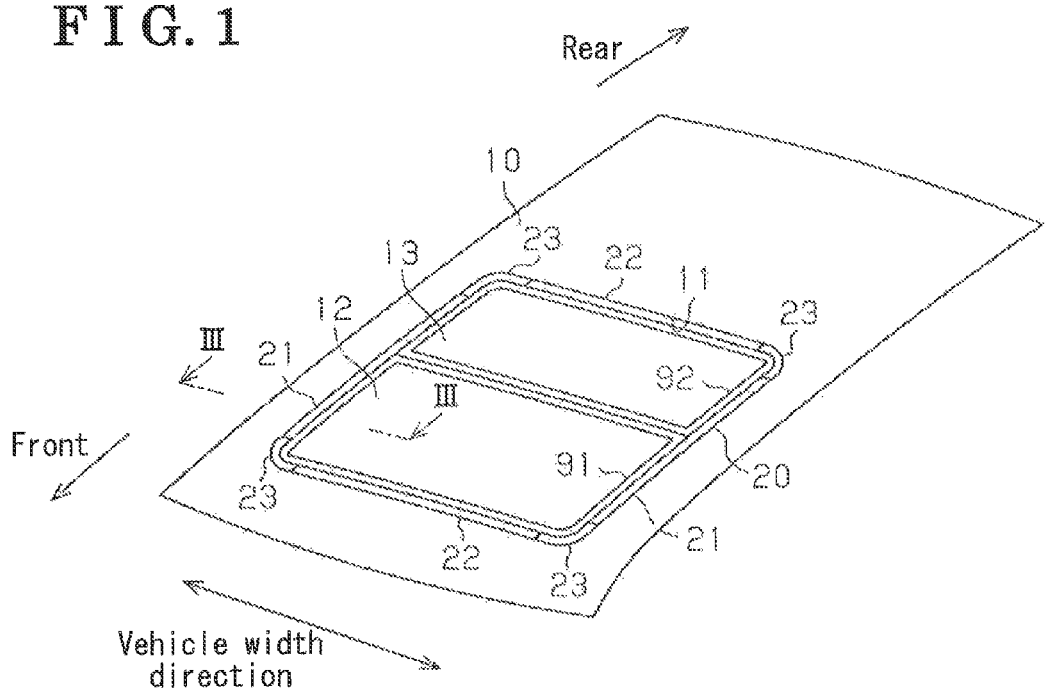
FIG. 1 is a perspective view showing a fully closed state of a roof apparatus according to an embodiment disclosed here.
Figure 2:
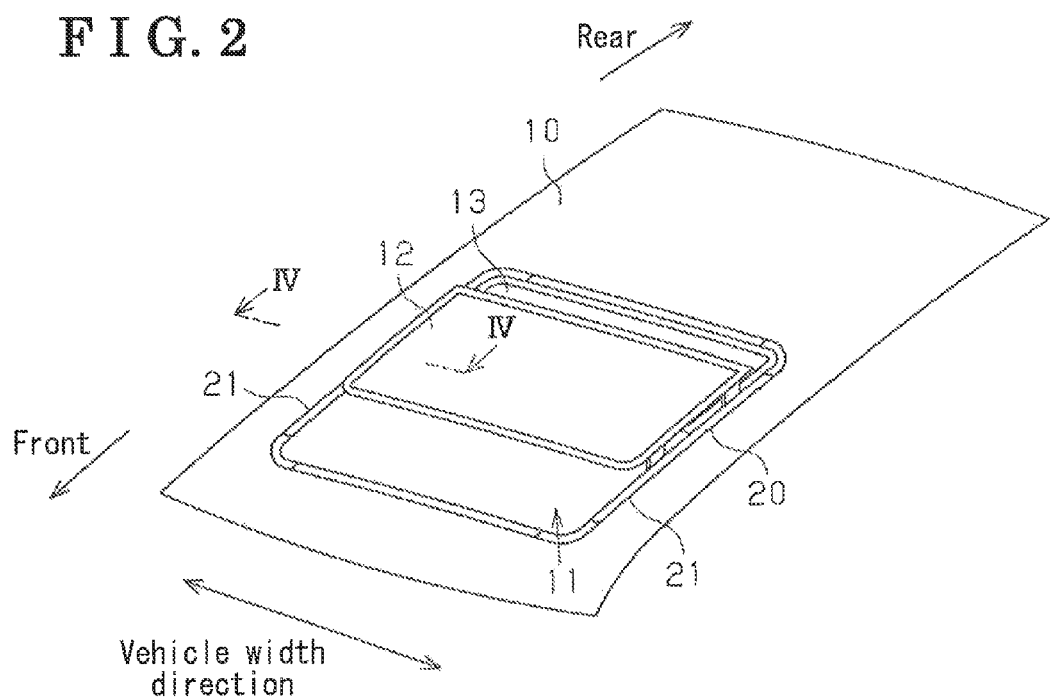
FIG. 2 is a perspective view showing an open state of the roof apparatus according to the embodiment disclosed here.

As shown in FIGS. 1 and 2, a roof opening portion 11 formed in a substantially quadrilateral configuration and serving as an opening portion is formed on a roof 10 serving as a roof portion of a vehicle, for example, an automobile. Further, a movable panel 12 and a fixed panel 13 each formed in a substantially quadrilateral configuration and made of, for example, a glass plate are provided at the roof 10. The movable panel 12 is attached to open and close a front portion of the roof opening portion 11. That is, the movable panel 12 is provided to perform a tilt-up operation in which a rear portion of the movable panel 12 is raised with a front portion of the movable panel 12 as a rotation center, a pop-up operation in which the front portion and the rear portion of the movable panel 12 are raised together, and a sliding operation in the front-rear direction. An outer sliding type, in which the movable panel 12 slides while maintaining a popped-up state, is adopted for an opening and closing operation of the front portion of the roof opening portion 11 by the movable panel 12. On the other hand, the fixed panel 13 is attached to always close a rear portion of the roof opening portion 11.

Further, a seal member 20 formed in a substantially quadrilateral loop shape is provided along a rim portion (peripheral rim portion) of the roof opening portion 11. The seal member 20 includes a pair of side-portion weather strips 21 serving as a weather strip positioned at opposite end sides in the vehicle width direction and extending in the front-rear direction, and a pair of front/rear portion weather strips 22 extending in the vehicle width direction and each connecting to a front end of the side-portion weather strip 21 and to a rear end of the side-portion weather strip 21 via a corner portion 23 which is made by die forming. The side-portion weather strip 21 includes a constant cross section in the front-rear direction, and the front/rear portion weather strip 22 includes a constant cross section in the vehicle width direction. The side-portion weather strips 21 and the front/rear portion weather strips 22 liquid-tightly contact an opening end rim (i.e., serving as an opening end of the opening portion) 11a of the roof opening portion 11.

On the other hand, the movable panel 12 includes a rim portion 91 formed in a substantially quadrilateral loop shape, made from, for example, a resin member, and provided along the peripheral portion of the movable panel 12. The fixed panel 13 includes a rim portion 92 formed in a substantially quadrilateral loop shape, made from, for example, a resin member, and provided along the peripheral portion of the movable panel 12. The rim portion 91 liquid-tightly contacts the front portions of the side-portion weather strips 21 provided at both opposite ends in the vehicle width direction and the front/rear portion weather strip 22 provided at the front side. The rim portion 92 liquid-tightly contacts rear portions of the side-portion weather strips 21 provided at both opposite ends in the vehicle width direction and the front/rear portion weather strip 22 provided at the rear side. Thus, an entire periphery of the roof opening portion 11 is sealed when the movable panel 12 is fully closed.

In those circumstances, when viewing the seal member 20 from upward (i.e., design surface side), the seal member 20 extends substantially linearly stretching the approximately full length, in a front-rear direction, of the roof opening portion 11 including a border portion of the movable panel 12 and the fixed panel 13. Further, when viewing from upward, the rim portion 91 of the movable panel 12 which comes in contact with each of the side-portion weather strips 21 in a state where the movable panel 12 is fully closed is arranged substantially linearly relative to the rim portion 92 of the fixed panel 13 which comes in contact with each of the side-portion weather strips 21 in a state where the movable panel 12 is fully closed. That is, the rim portion 91 of the movable panel 12 and the rim portion 92 of the fixed panel 13 are positioned in the similar positional arrangement from each other in a vehicle width direction.

A structure associated with the opening and closing operation of the movable panel 12 will be explained hereinafter. Because the structure associated with the opening and closing operation of the movable panel 12 is basically symmetrically formed in the vehicle width direction, for an explanatory purpose, structure of only one side in the vehicle width direction will be explained hereinafter.

Figure 3:
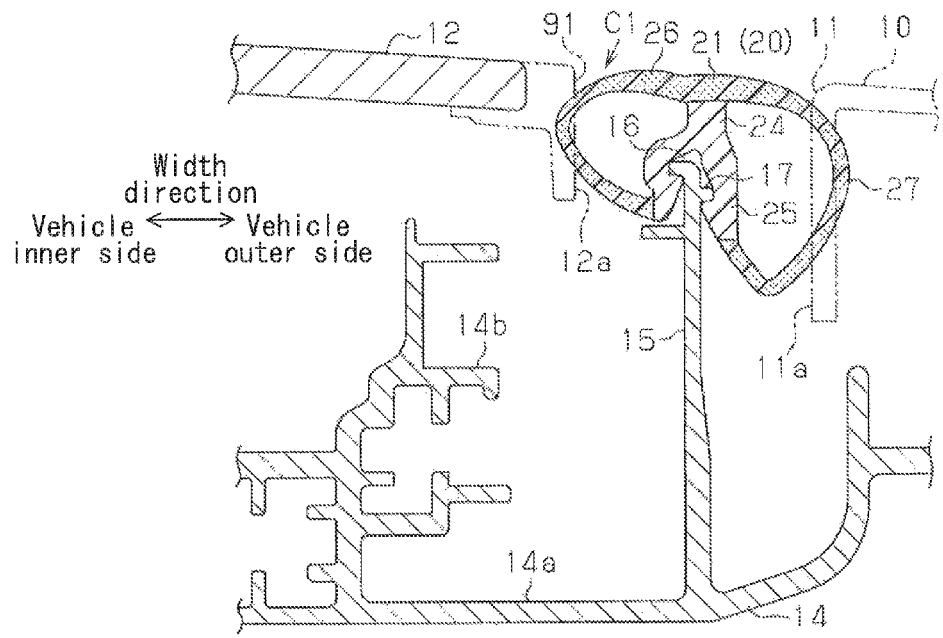
FIG. 3 is a cross-sectional view taken along a line III-III shown in FIG. 1.
Figure 4:
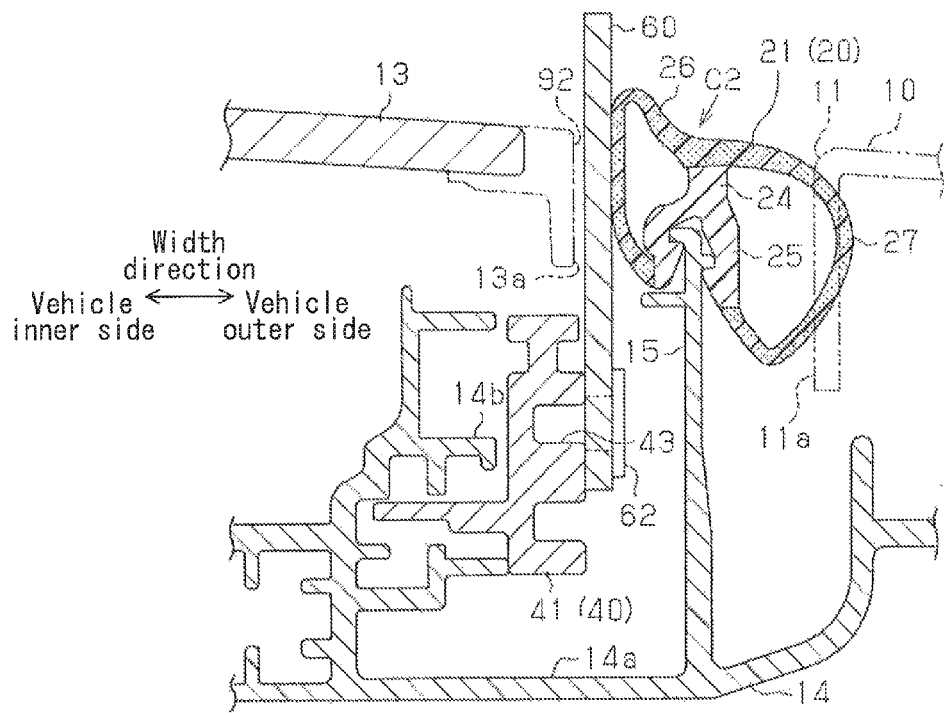
FIG. 4 is a cross-sectional view taken along a line IV-IV shown in FIG. 2.

As shown in FIGS. 3 and 4, a guide rail (i.e., serving as a retaining member) 14 made from an extruded member, for example, made of aluminum alloy and extending in a front-rear direction (i.e., direction orthogonal to the drawing in FIG. 3) is provided at each of rim portions of the roof 10 in the vehicle width direction under the roof opening portion 11. The guide rail 14 includes a bottom wall 14a, formed in an elongated form and extending in the front-rear direction, and a vertical wall portion 15 formed standing upwardly from the bottom wall 14a. The vertical wall portion 15 is positioned within a clearance C1 formed between the opening end rim 11a, which is formed in a flange shape and extending downwardly of the roof opening portion 11, and a vehicle-width-direction rim end 12a, which is formed in a flange shape and extending downward of the movable panel 12 which is in the fully closed state. The vertical wall portion 15 is positioned within a clearance C2 formed between the opening end rim 11a of the roof opening portion 11 and a vehicle-width-direction rim end 13a formed in a flange shape extending downward of the fixed panel 13.

The guide rail 14 includes a first stopper portion 16 formed in a flange shape and provided to protrude from a top end of the vertical wall portion 15 towards a vehicle inner side, and a second stopper portion 17 formed in a flange shape and provided at the vertical wall portion 15 to protrude towards a vehicle outer side at a lower level compared to the first stopper portion 16. The side-portion weather strip 21 is fitted to a top portion of the vertical wall portion 15. The guide rail 14 includes a rail portion 14b formed in a substantially U-shape in cross section which opens to the vehicle outer side and positioned at the vehicle inner side relative to the clearances C1, C2 and at a higher level compared to the bottom wall 14a.

Figure 7:
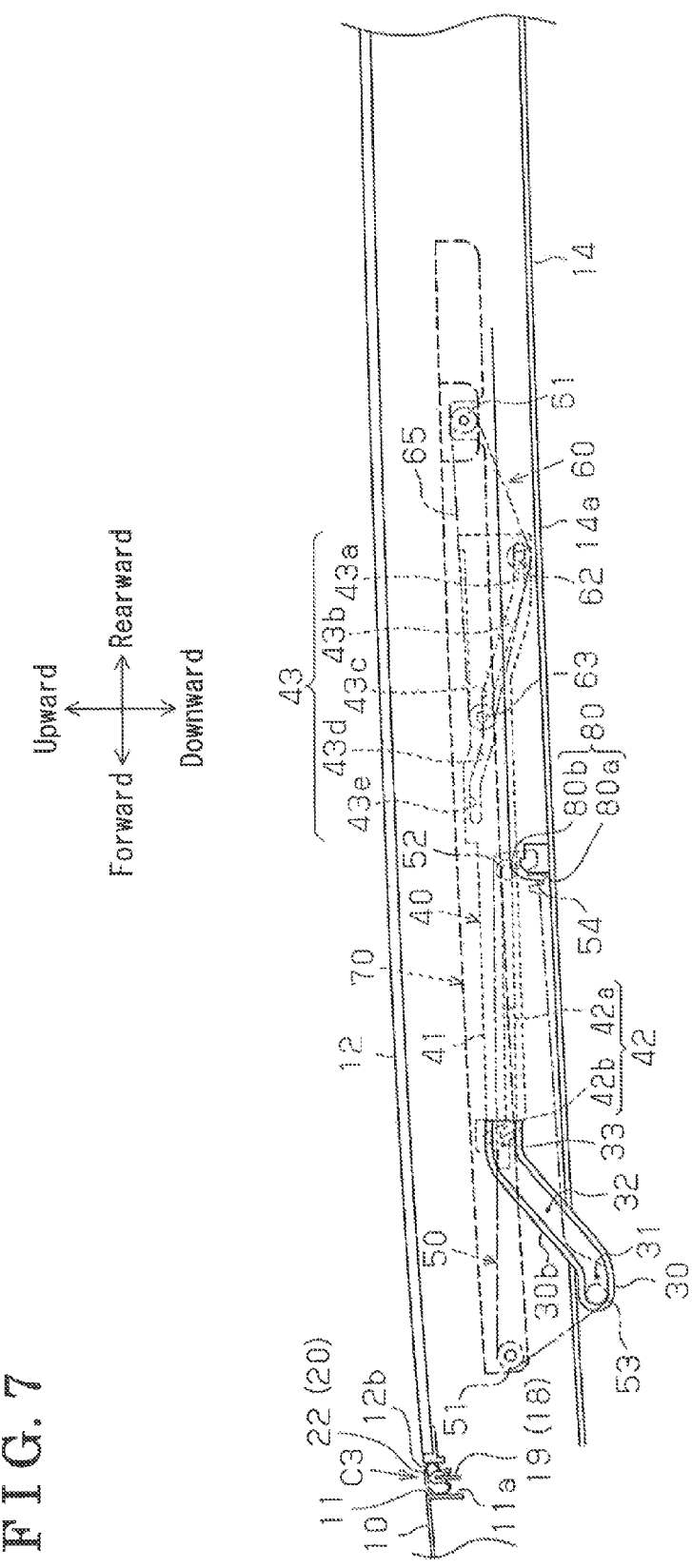
FIG. 7 is a longitudinal cross-sectional view showing the fully closed state of the roof apparatus according the embodiment disclosed here.

As shown in FIG. 7, a front housing (i.e., serving as a front/rear portion retaining member) 18, for example, made from a resin member is provided at a front side rim portion of the roof 10 to extend in the vehicle width direction (i.e., the direction orthogonal to the drawing in FIG. 7) under the roof opening portion 11. The front housing 18 includes a vertical wall portion 19 provided to stand upwardly within a clearance C3 formed between the opening end rim 11a and a front side rim end 12b which is formed in a flange shape and extending downward of the movable panel 12 which is in the fully closed state. The front/rear portion weather strip 22 is fitted onto a top portion of the vertical wall portion 19.

A front side guide member 30 is attached to a front end portion of the guide rail 14. A driving shoe 40 is provided at a rear of the front side guide member 30 to be movable in a front-rear direction. Further, a front side link member (i.e., serving as a cooperating member) 50 formed in a substantially plate shape and a rear side link member (i.e., serving as a cooperating member) 60 are supported by the guide rail 14. A support bracket 70 having an elongated shape extending in the front-rear direction and positioned above the guide rail 14 is fixed to a lower surface of the movable panel 12 via a rear side connection pin 61. The front side link member 50 and the rear side link member 60 are connected to a front end portion and a rear end portion of the support bracket 70, respectively. A restriction block 80 is fixed on the bottom wall 14a of the guide rail 14.

The front side guide member 30 includes a front side groove portion 31 extending in a front-rear direction, an inclined groove portion 32 connected to a rear end of the front side groove portion 31 and extending in an rearward and upward direction with a slope (the inclined groove portion 32 inclining rearwards), and a rear side groove portion 33 connected to a rear and of the inclined groove portion 32 and extending in a front-rear direction. The front side groove portion 31 is positioned at a lower level compared to a lowermost end of the guide rail 14 (bottom wall 14a) and a front end of the front side groove portion 31 is closed. Further, a rear side groove portion 33 is positioned at a higher level compared to the lowermost end of the guide rail 14 and a rear end of the rear side groove portion 33 is open. The rear side groove portion 33 is in communication with the rail portion 14b of the guide rail 14 at the rearward thereof.

The driving shoe 40 is formed to be accommodated under, for example, the movable panel 12 which is in a fully closed state. The driving shoe 40 includes a shoe main body 41 which is formed in a plane plate extending in a front-rear direction, and a first groove portion 42 and a second groove portion 43 which are formed in long groove shapes extending in the front-rear direction at the shoe main body 41. The driving shoe 40 is connected to an actuator at the shoe main body 41 and is actuated to move in the front-rear direction by the actuator.

The first groove portion 42 includes a rear side groove 42a extending in the front-rear direction and a front side groove 42b connected to a front and of the rear side groove 42a and extending in a forward and upward direction with a slope (the front side groove 42b inclining forwards). A rear end of the rear side groove 42a and a front end of the front side groove 42b are closed.

The second groove portion 43 is positioned at the rearward relative to the first groove portion 42, and is provided independently from the first groove portion 42. The second groove portion 43 includes a rear side front-rear groove 43a, a rear side inclined groove 43b connected to a front end of the rear side front-rear groove 43a and extending in a forward and upward direction with a slope (the rear side inclined groove 43b inclining forwards), a central front-rear groove 43c connected to a front end of the rear side inclined groove 43b, a front side inclined groove 43d connected to a front end of the central front-rear groove 43c and extending in a forward and upward direction with a slope (inclining forwards), and a front side front-rear groove 43e connected to a front end of the front side inclined groove 43d. The rear side front-rear groove 43a, the central front-rear groove 43c, and the front side front-rear groove 43e extend in the front-rear direction of the vehicle. A rear end of the rear side front-rear groove 43a and a front end of the front side front-rear groove 43e are closed.

The front side link member 50 includes a substantially inverted triangle shape in cross section when viewing from a side and includes a substantially triangular pole shape extending in the front-rear direction. A portion corresponding to a bottom portion of the front side link member 50 is arranged to extend in the front-rear direction so as to be accommodated under the movable panel 12 in a state where the movable panel 12 is in a fully closed state. A front side connection pin 51 is provided at an upper front end portion of the front side link member 50 to protrude in a vehicle width direction. A front side engagement pin 52 is provided at a rear end portion of the front side link member 50 to protrude in a vehicle width direction. Further, a front side support pin 53 is provided at a lower front end portion of the front side link member 50 in a vehicle width direction, and a restriction pin 54 is formed at a portion in the vicinity of the front side engagement pin 52.

The front side connection pin 51 is connected to a front end portion of the support bracket 70 to be relatively rotatable. The front side engagement pin 52 is inserted into a first groove portion 42 of the driving shoe 40, and is engaged to be rotatable and to be movable in a front-rear direction relative to the driving shoe 40. Then, the front side engagement pin 52 is positioned at a rear end of the rear side groove 42a when the movable panel 12 is in the fully closed state.

The front side support pin 53 is inserted to be positioned in the front side guide member 30, for example, when the movable panel 12 is in the fully closed state, and is engaged to be rotatable and relatively movable in a front-rear direction relative to the front side guide member 30. In a state where the movable panel 12 is in the fully closed state, the front side support pin 53 is positioned at a front end of the front side groove portion 31. The restriction pin 54 is positioned at a lower front position relative to the front side engagement pin 52, and is positioned at a front side of the restriction block 80 and is in contact with a restriction surface 80a serving as a front side end surface of the restriction block 80 when the movable panel 12 is in the fully closed state. In those circumstances, the restriction surface 80a is positioned immediately below the front side engagement pin 52. The restriction block 80 is formed with a guide surface 80b which extends from an upper end of the restriction surface 80a in an rearward and upward direction with a slope (the guide surface 80b inclining rearwards).

The rear side link member 60 includes a substantially inverted triangle shape in cross section when viewing from a side and includes a substantially triangular pole shape extending in the front-rear direction. A portion corresponding to a bottom portion of the rear side link member 60 is arranged to extend in the front-rear direction so as to be accommodated under the movable panel 12 in a state where the movable panel 12 is in a fully closed state. The rear side connection pin 61 is provided at a rear end portion of the rear side link member 60 to protrude in a vehicle width direction. A rear side engagement pin 62 is provided at a lower end portion of the rear side link member 60 to protrude in a vehicle width direction. Further, a rear side support pin 63 is provided at a front end portion of the rear side link member 60 to protrude in a vehicle width direction.

The rear side connection pin 61 is connected to a rear end portion of the support bracket 70 to be relatively rotatable. The rear side engagement pin 62 is positioned at an intermediate portion of the rear side link member 60 in a longitudinal direction, inserted to be positioned in the second groove portion 43 of the driving shoe 40, and is engaged to be rotatable and movable in a front-rear direction relative to the driving shoe 40. In a state where the movable panel 12 is in the fully closed state, the rear side engagement pin 62 is positioned at a rear end of the rear side front-rear groove 43a. The rear side support pin 63 is inserted to be positioned in the rail portion 14b of the guide rail 14 and is engaged to be rotatable and movable in a front-rear direction relative to the rail portion 14b.

As illustrated in FIG. 7, when the driving shoe 40 moves in a rearward direction in a state where the movable panel 12 is in the fully closed state, the front side link member 50 together with the support bracket 70 is prevented from moving in the rearward direction because the restriction pin 54 is positioned at a front side of the restriction block 80 and is in contact with the restriction surface 80a. Accordingly, the driving shoe 40 moves in a rearward direction relative to the front side link member 50 while allowing an idle running of the front side engagement pin 52 within the first groove portion 42 (rear side groove 42a). On the other hand, the rear side link member 60 is rotated about the rear side support pin 63 to raise the rear side connection pin 61 without moving in a backward direction because the rear side engagement pin 62 is guided by the second groove portion 43.

Figure 8:
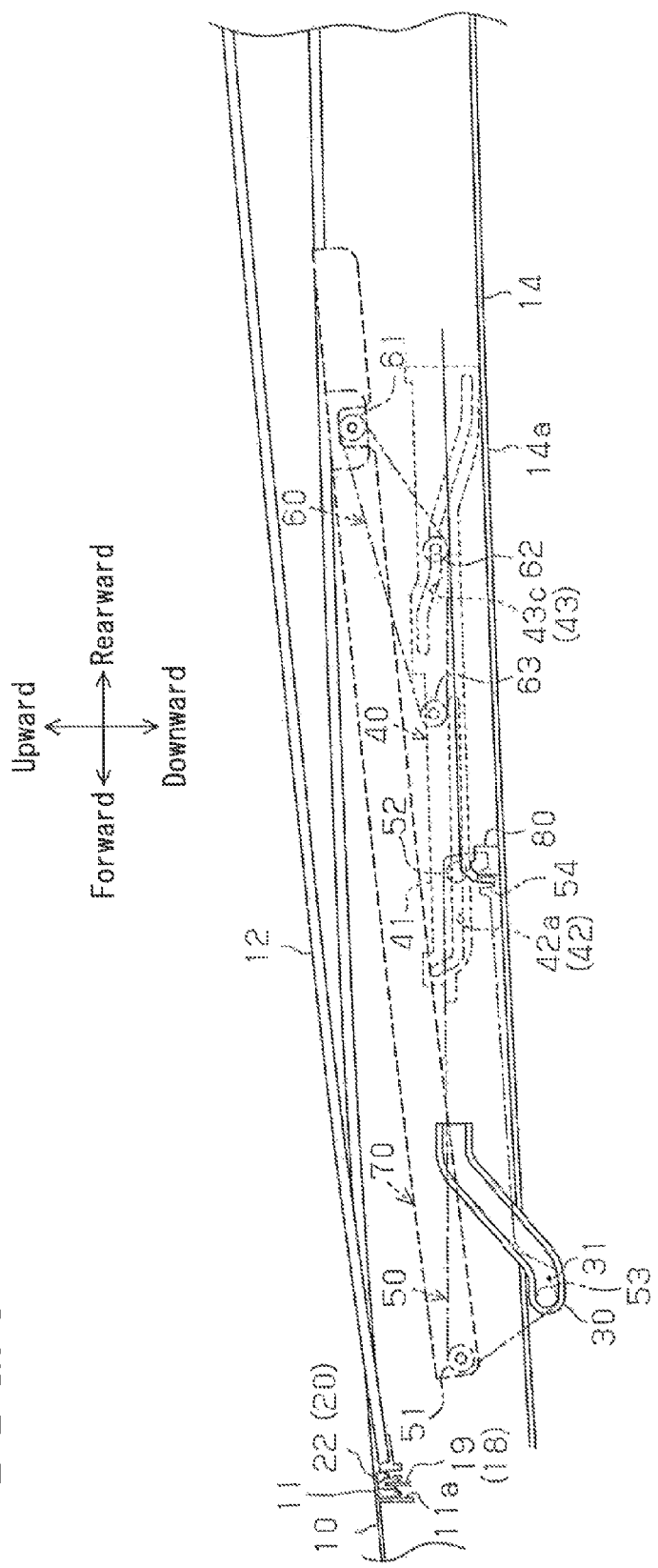
FIG. 8 is a longitudinal cross-sectional view showing a tilted-up state of the roof apparatus according to the embodiment disclosed here.

Thus, the support bracket 70 whose front end portion and rear end portion are connected to the front side link member 50 and the rear side link member 60, respectively, performs a tilt-up operation in which a rear portion of the support bracket 70 is raised about a front portion of the support bracket 70 together with the movable panel 12 (the rear portion of the support bracket 70 is raised together with the movable panel 12 with a front portion of the support bracket 70 as a rotation center). As illustrated in FIG. 8, when the rear side engagement pin 62 of the rear side link member 60 reaches the central front-rear groove 43c of the second groove portion 43, a transition to the tilted-up state in which the movable panel 12 raises the rear side portion with the front side portion thereof as a rotation center is completed.

Figure 9:
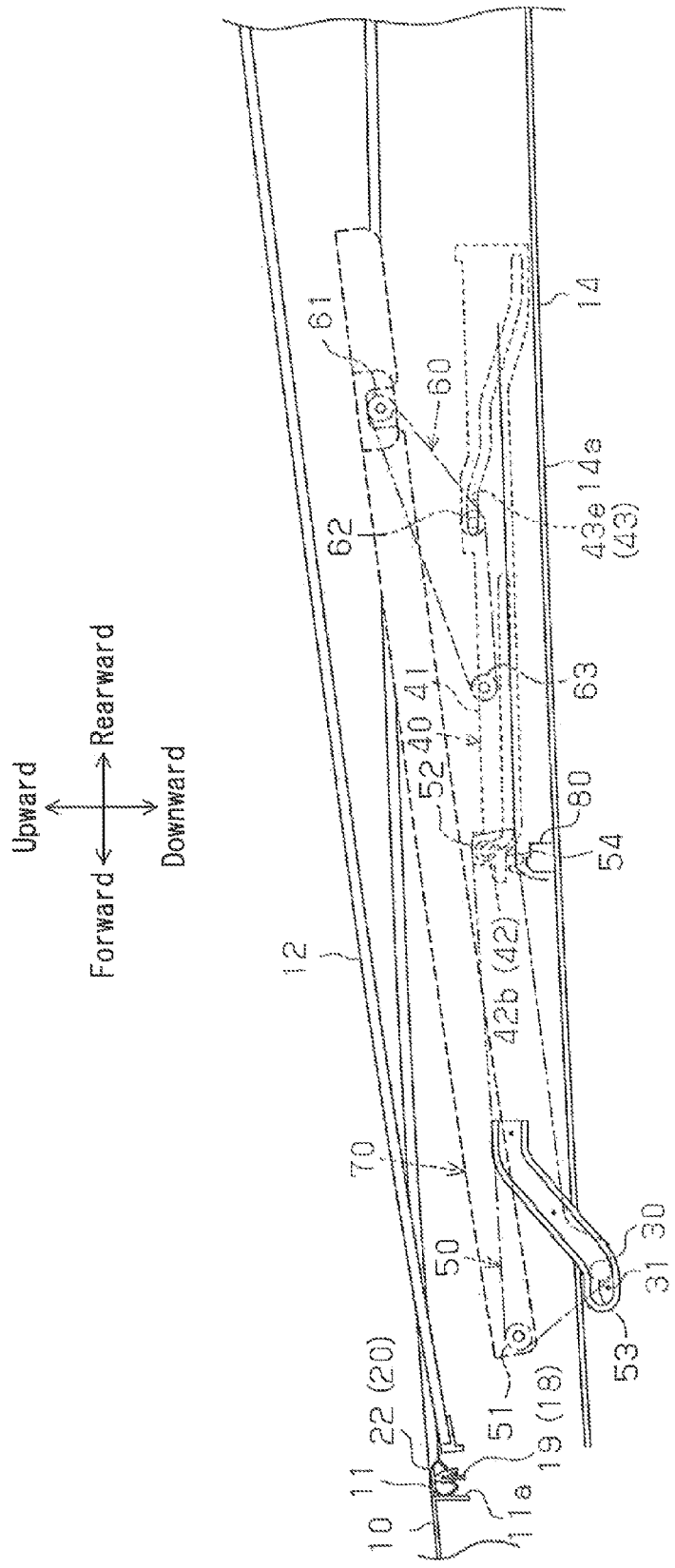
FIG. 9 is a longitudinal cross-sectional view showing a transitional state to a pop-up operation of the roof apparatus according to the embodiment disclosed here.

Thereafter, provided that the driving shoe 40 further moves in a rearward direction, in those circumstances, similarly, the support bracket 70 whose front end portion and rear end portion are connected to the front side link member 50 and the rear side link member 60, respectively, further performs the tilt-up operation together with the movable panel 12. Then, as shown in FIG. 9, when the front side front-rear groove 43e of the second groove portion 43 reaches the rear side engagement pin 62 of the rear side link member 60, a motion of the driving shoe 40 in a rearward direction relative to the rear side engagement pin 62 is stopped. Simultaneously, a motion of the driving shoe 40 in a rearward direction relative to the front side engagement pin 52 is stopped by the front side groove 42b of the first groove portion 42 reaching the front side engagement pin 52 of the front side link member 50. In those circumstances, the restriction pin 54 is displaced to incline in a upward and rearward direction along the guide surface 80b of the restriction block 80 because the front side link member 50 and the rear side link member 60 move in a rearward direction together with the driving shoe 40 integrally. Thus, due to the restriction pin 54 climbing over, or crossing over the restriction block 80, the motion of the front side link member 50 in the rearward direction is allowed (i.e., the rearward motion of the front side link member 50 is released).

Accordingly, when the driving shoe 40 further moves in a rearward direction, the front side engagement pin 52 and the rear side engagement pin 62 are pulled by the front side groove 42b of the first groove portion 42 and the front side front-rear groove 43e of the second groove portion 43, respectively, so that the front side link member 50 and the rear side link member 60 move rearward together with the support bracket 70. In those circumstances, an attitude of the rear side link member 60 is maintained by the rear side engagement pin 62 positioned in the front side front-rear groove 43e of the second groove portion 43 and by the rear side support pin 63 sliding in the rail portion 14b. On the other hand, the front side support pin 53 is guided by the front side guide member 30 so as to rotate the front side link member 50 about the front side engagement pin 52 to raise the front side connection pin 51 (to raise the front side connection pin 51 with the front side engagement pin 52 as a rotation center). Then, the support bracket 70 whose front end portion and rear end portion are connected to the front side link member 50 and the rear side link member 60, respectively, raises the front end portion thereof about the rear side portion thereof (i.e., rear side connection pin 61) together with the movable panel 12 to perform a popped-up operation in which an entire portion of the movable panel 12 moves upward relative to the roof 10.

Figure 10:
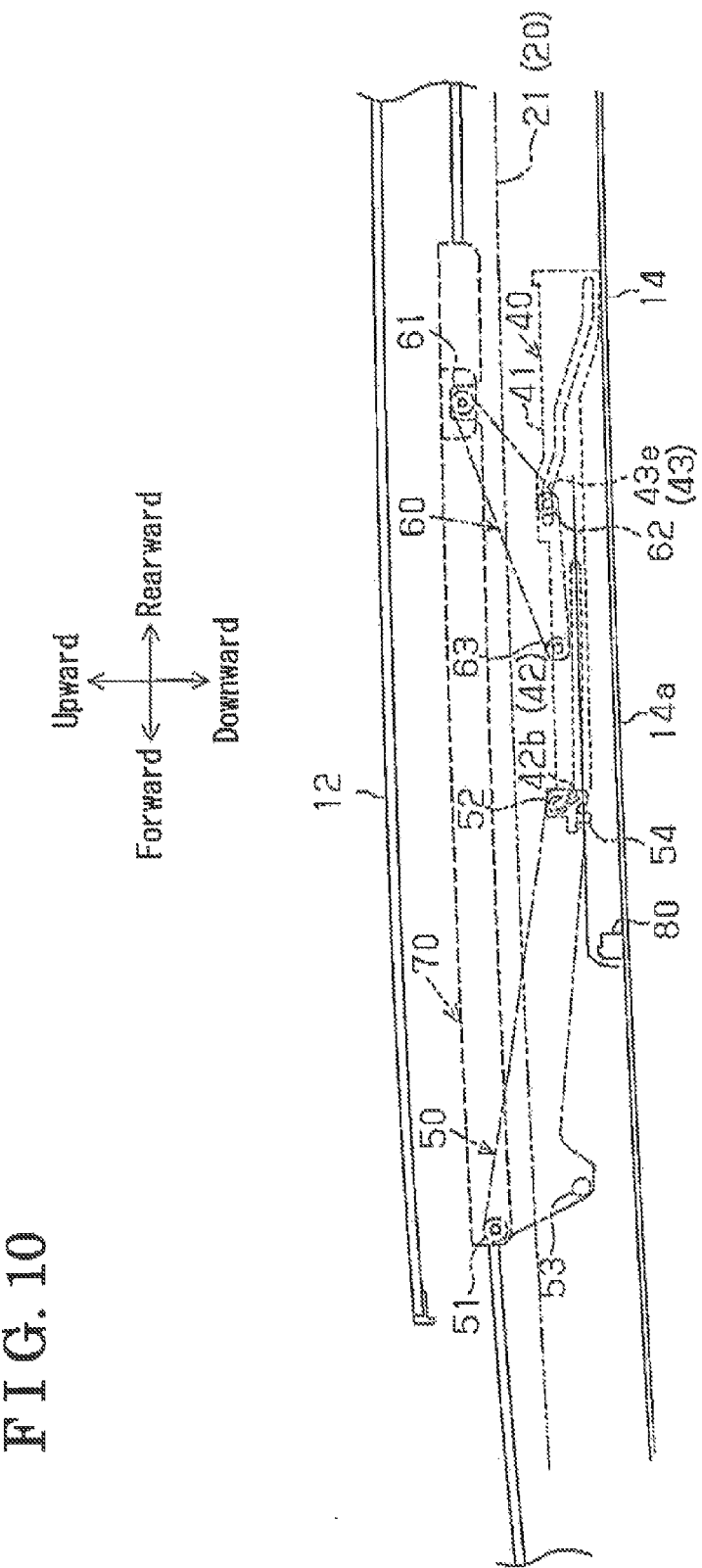
FIG. 10 is a longitudinal cross-sectional view showing a popped-up state of the roof apparatus according to the embodiment disclosed here.

In response to the popped-up operation, upon the introduction of the front side support pin 53 guided by the front side guide member 30 onto the rail portion 14b of the guide rail 14, a transition to a popped-up state in which the entire movable panel 12 moves upward relative to the roof 10 is completed. Thus, when the driving shoe 40 further moves rearward, the front side link member 50 and the rear side link member 60 integrally move rearward while sliding the front side support pin 53 and the rear side support pin 63 on the rail portion 14b. In those circumstances, the front side link member 50 maintains the attitude by the front side engagement pin 52 positioned in the front side groove 42b of the first groove portion 42 and by the front side support pin 53 sliding on the rail portion 14b. The rear side link member 60 maintains the attitude by the rear side engagement pin 62 positioned in the front side front-rear groove 43e of the second groove portion 43 and by the rear side support pin 63 sliding on the rail portion 14b. As shown in FIG. 10, the movable panel 12 moves rearward while maintaining the popped-up state to open the roof opening portion 11.

Further, when the driving shoe 40 moves forward in a state where the movable panel 12 is in an open state (i.e., popped-up state), the front side link member 50 pushed by the front side groove 42b of the first groove portion 42 (driving shoe 40) integrally moves forward together with the rear side link member 60 and the support bracket 70. In those circumstances, attitudes of the front side link member 50 and the rear side link member 60 are maintained in a manner explained above, thus the movable panel 12 moves forward while maintaining the popped-up state to close the roof opening portion 11.

In response to the foregoing state, upon the introduction of the front side support pin 53 sliding in the rail portion 14b onto the front side guide member 30, the front side link member 50 guided by the front side guide member 30 rotates about the front side engagement pin 52 (with the front side engagement pin 52 as a rotation center) to move the front side connection pin 51 downward. Then, when the front side support pin 53 reaches the front side groove portion 31 of the front side guide member 30, the motion of the front side link member 50 in a forward direction is stopped. The support bracket 70 whose front end portion and rear end portion are connected to the front side link member 50 and the rear side link member 60, respectively, moves the front side portion thereof downward about the rear side portion thereof (i.e., rear side connection pin 61) together with the movable panel 12 to complete a transition to the tilted-up state (i.e., return to the tilted-up state). Further, in response to the completion of the transition to the tilted-up state, the restriction pin 54 of the front side link member 50 comes to position at the front side of the restriction block 80.

Thereafter, when the driving shoe 40 further moves forward while allowing an idle running of the front side engagement pin 52 within the first groove portion 42 (rear side groove 42a), the rear side link member 60 rotates about the rear side support pin 63 (with the rear side support pin 63 as a rotation center) to move the rear side connection pin 61 downward without moving forward because the rear side engagement pin 62 is guided by the second groove portion 43.

Accordingly, the support bracket 70 whose front end portion and rear end portion are connected to the front side link member 50 and the rear side link member 60, respectively, performs a tilt-down operation in which the rear side portion of the support bracket 70 moves downward about the front side portion of the support bracket 70 (with the front side portion of the support bracket 70 as a rotation center) together with the movable panel 12. Then, as shown in FIG. 7, the movable panel 12 returns to the fully closed state when the rear side engagement pin 62 of the rear side link member 60 reaches the rear side front-rear groove 43a of the second groove portion 43.

As shown in FIG. 4, the rear side link member 60 supported by the guide rail 14 via the driving shoe 40 is positioned between the vertical wall portion 15 and the vehicle-width-direction rim end 13a (i.e., between the vertical wall portion 15 and the vehicle-width-direction rim end 12a of the movable panel 12) in a width direction of the vehicle. In a state where the movable panel 12 moves upward relative to the roof opening portion 11 (roof 10) to open the roof opening portion 11, the rear side link member 60 protrudes to be higher level than the side-portion weather strip 21 through the clearance C2 (or clearance C1). The front side link member 50 operates in a similar manner to the rear side link member 60.

As a lower surface position of the side-portion weather strip 21 of the front side link member 50 and the rear side link member 60 is indicated with double-dash chain line in FIG. 10, the front side link member 50 and the rear side link member 60 protrude upward relative to the lower side of the side-portion weather strip 21 when the movable panel 12 moves upward relative to the roof opening portion 11 (roof 10) to open the roof opening portion 11. In those circumstances, the side-portion weather strip 21 is deformed in an upward direction. Further, when the movable panel 12 performs the slide operation in the popped-up state, the front side link member 50 and the rear side link member 60 slide along, or slide on the side-portion weather strip 21. The front side link member 50 and the rear side link member 60 retract to be positioned below (to be lower level than) the side-portion weather strip 21 when the movable panel 12 moves downward relative to the roof opening portion 11 (roof 10) to close the roof opening portion 11. In those circumstances, the vehicle-width-direction rim end 12a of the movable panel 12 comes in contact with the side-portion weather strip 21 while deforming the side-portion weather strip 21.

Figure 5:
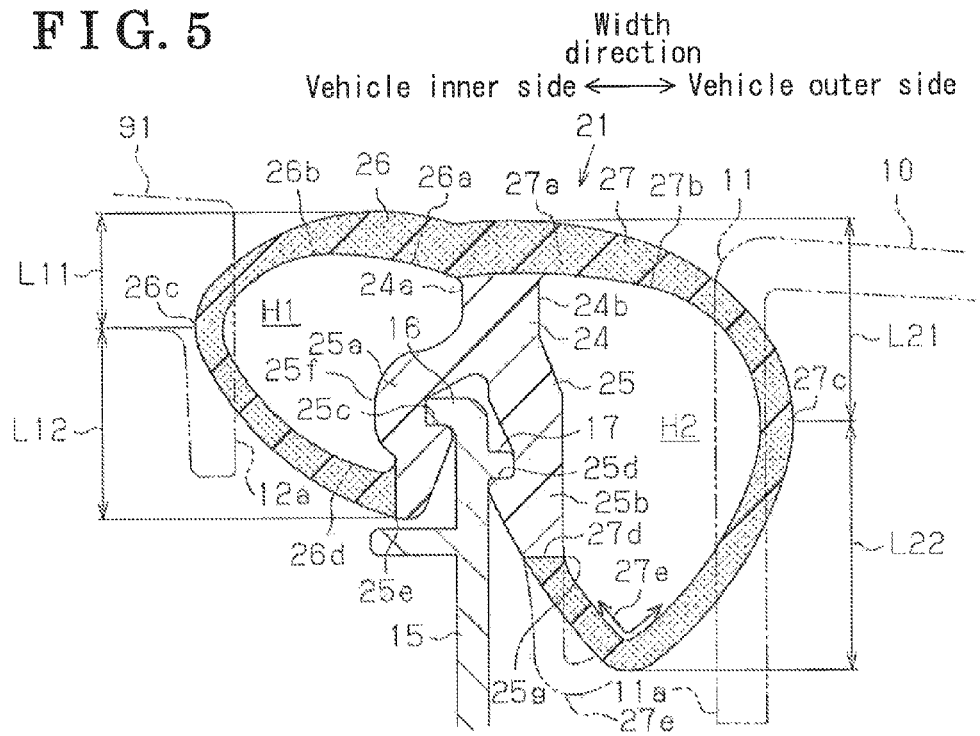
FIG. 5 is a lateral cross-sectional view showing a side-portion weather strip according to the embodiment disclosed here.

Next, structures of the side-portion weather strip 21 will be explained hereinafter. As illustrated in FIG. 5, the side-portion weather strip 21 includes a portion 24 to be retained made from a resin member, and a first seal portion 26 and a second seal portion 27 which are connected to a top end of the portion 24 to be retained and made from a sealing member which is softer than the resin member from which the portion 24 to be retained is made (e.g., sponge member). The portion 24 to be retained includes a fitting portion 25 which is configured to be fitted onto the vertical wall portion 15. The fitting portion 25 includes a pair of projection portions 25a, 25b sandwiching the vertical wall portion 15 from a vehicle inner side (i.e., the side closer to and provided facing the vehicle-width-direction rim end 12a of the movable panel 12, that is, a peripheral rim end of the movable panel 12) and from a vehicle outer side (i.e., the side closer to and provided facing the opening end rim 11a of the roof opening portion 11), respectively.

The projection portion 25a is curved to protrude towards the vehicle inner side along a configuration of the first stopper portion 16. A first stopper pawl 25c having a substantially pawl shape configured to engage with a lower surface of the first stopper portion 16 is formed at a lower end portion of the projection portion 25a. A projection portion 25b formed in a substantially rack shape protrudes towards the vehicle outer side along a configuration of the second stopper portion 17. A second stopper pawl 25*d* formed in a substantially pawl shape configured to be engaged with a lower surface of the second stopper portion 17 is formed at a lower portion of the projection portion 25*b*. The first and second stopper pawls 25*c*, 25*d* are engaged with the lower surfaces of the first and second stopper portions 16, 17 in a state where the fitting portion 25 fits onto the vertical wall portion 15, thus, the portion 24 to be retained is prevented from disengaging from the vertical wall portion 15.

The first seal portion 26 is curved to protrude towards the vehicle inner side (i.e., towards the peripheral rim end of the movable panel 12) and to have a bow-like shape in cross section. The first seal portion 26 is connected to a vehicle inner side surface of a lower end portion of the projection portion 25*a* (portion 24 to be retained). Thus, the first seal portion 26 forms a first hollow portion H1 at the vehicle inner side relative to the vertical wall portion 15 together with the portion 24 to be retained. The first seal portion 26 elastically deforms, or resiliently reforms so as to overlap with a portion of the vehicle-width-direction rim end 12*a* of the movable panel 12 in a vehicle height direction and to liquid-tightly contact therewith in a state where the movable panel 12 is in a fully closed state.

In a free state (a state where a shape which is once deformed is returned to an original shape because of elasticity), a thickness of the first seal portion 26 gradually reduces from a first end portion 26*a* corresponding to a base at an upper end side of the portion 24 to be retained towards an intermediate portion 26*b*, and further reduces from the intermediate portion 26*b* towards a first looped portion (i.e., serving as a first turned back portion) 26*c* provided facing the vehicle-width-direction rim end 12*a* (i.e., facing the peripheral rim end of the movable panel 12) of the movable panel 12. Further, a thickness of the first seal portion 26 gradually increases from the first looped portion 26*c* towards a second end portion 26*d* corresponding to a base portion of the lower end portion side of the portion 24 to be retained. The thickness of the second end portion 26*d* is set to be smaller than the thickness of the first end portion 26*a* among the first seal portion 26. A distance L12 in a vehicle height direction from the lower end of the first seal portion 26 to the first looped portion 26*c* is set to be greater than a distance L11 in a vehicle height direction from the upper end of the first seal portion 26 to the first looped portion 26*c*.

An edge 24*a* provided at an upper end of the portion 24 to be retained connected to the first seal portion 26 and provided facing the vehicle-width-direction rim end 12*a* (i.e., facing the peripheral rim end of the movable panel 12) is positioned closer to the opening end rim 11*a* of the roof opening portion 11 compared to an end 25*e* provided at the fitting portion 25 (portion 24 to be retained) connected to the first seal portion 26 and provided facing the vehicle-width-direction rim end 12*a* (i.e., facing the peripheral rim end of the movable panel 12). Further, the end 25*e* provided at the lower end portion of the fitting portion 25 is positioned closer to the opening end rim 11*a* of the roof opening portion 11 compared to an edge 25*f* provided at the fitting portion 25 and facing the vehicle-width-direction rim end 12*a* of the movable panel.

The second seal portion 27 is curved to protrude towards the vehicle outer side (i.e., towards the opening end rim 11*a* of the roof opening portion 11) and is formed to have a bow configuration in cross section. The second seal portion 27 is connected to a lower end of the projection portion 25*b* (portion 24 to be retained). Thus, the second seal portion 27 forms a second hollow portion H2 at the vehicle outer side relative to the vertical wall portion 15 together with the portion 24 to be retained. The second seal portion 27 elastically deforms, or resiliently deforms so as to overlap with a portion of the opening end rim 11*a* of the roof opening portion 11 in a vehicle height direction, and the second seal portion 27 liquid-tightly contacts the portion of the opening end rim 11*a*.

In a free state (a state where a shape which is once deformed is returned to an original shape because of elasticity), a thickness of the second seal portion 27 gradually reduces from a third end portion 27*a* corresponding to a base portion provided at an upper end of the portion 24 to be retained towards an intermediate portion 27*b* and a thickness of the second seal portion 27 gradually reduces from the intermediate portion 27*b* towards a second looped portion 27*c* (serving as a second turned back portion) provided facing the opening end rim 11*a* of the roof opening portion 11 (i.e., provided closer to the opening end rim 11*a*). Further, the second seal portion 27 includes a fourth end portion 27*d* corresponding to a base portion at a lower end side of the portion 24 to be retained. A portion 27*e* of the second seal portion 27 provided between the second looped portion 27*c* and the fourth end portion 27*d* is bent to protrude downwardly and to have a substantially V-shape in cross section. A thickness of the fourth end portion 27*d* of the second seal portion 27 is set to be smaller than a thickness of the third end portion 27*a*. A distance L22 in a vehicle height direction from a lower end of the second seal portion 27 to the second looped portion 27*c* is set to be greater than a distance L21 in a vehicle height direction from an upper end of the second seal portion 27 to the second looped portion 27*c*.

An edge 24*b* provided facing the opening end rim 11G of the roof opening portion 11 and provided at an upper end of the portion 24 to be retained connected to the second seal portion 27 is positioned closer to the vehicle-width-direction rim end 12*a* of the movable panel 12 (closer to the peripheral rim end of the movable panel) compared to an end 25*g* provided at a lower end of the fitting portion 25 (portion 24 to be retained), connected to the second seal portion 27 and provided facing the opening end rim 11*a* of the roof opening portion 11.

Figure 6:
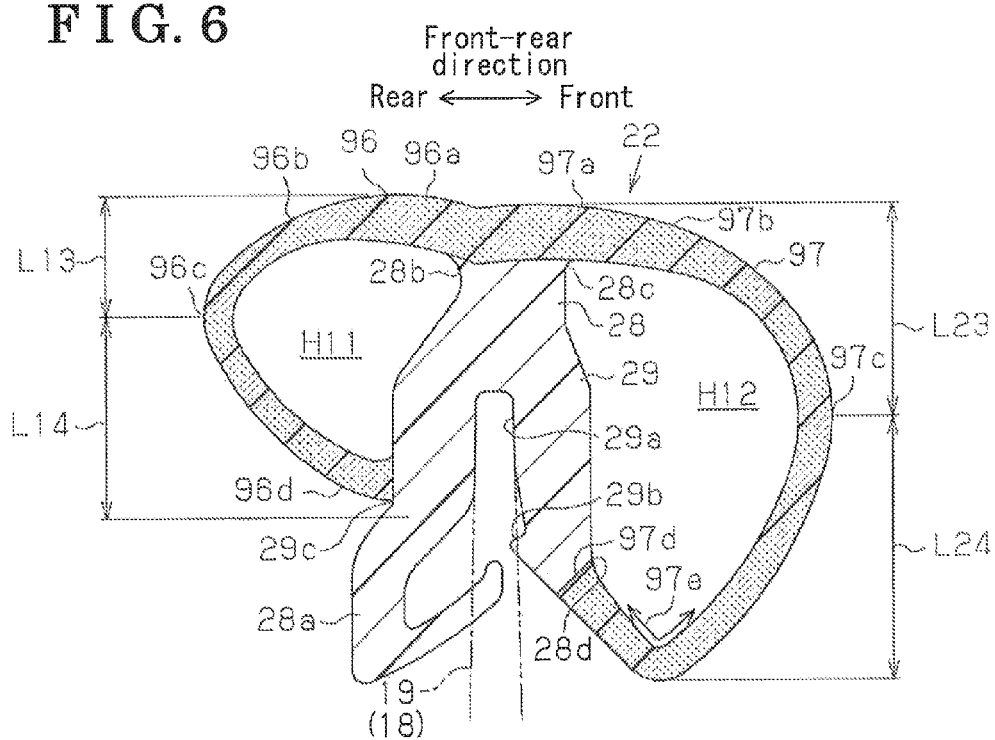
FIG. 6 is a lateral cross-sectional view showing a front/rear portion weather strip according to the embodiment disclosed here.

Next, structures of the front/rear portion weather strip 22 provided at the front side will be explained hereinafter. As shown in FIG. 6, the front/rear portion weather strip 22 includes a portion 28 to be retained for front/rear portion made from resin member, and a first front/rear portion seal portion 96 and a second front/rear portion seal portion 97 which are connected to an upper end of the portion 28 to be retained for front/rear portion and are made from sealing members softer than the resin member from which the portion 28 to be retained for front/rear portion is made (e.g., sponge member).

The portion 28 to be retained for front/rear portion includes a front/rear portion fitting portion 29 configured to be fitted onto a vertical wall portion 19 of the front housing 18. A fitting groove 29*a* formed in a substantially U-shape and configured to fit onto the vertical wall portion 19 is formed at the front/rear portion fitting portion 29 so that the front/rear portion fitting portion 29 sandwiches the vertical wall portion 19 from a rear side (a side closer to and provided facing a peripheral rim end of the movable panel 12) and a front side (a side closer to and provided facing the opening end rim 11*a* of the roof opening portion 11). Further, the portion 28 to be retained for front/rear portion includes a lip portion 28*a* formed in a hook shape in cross section and extending downward from the front/rear portion fitting portion 29 at the rearward relative to the vertical wall portion 19. A protrusion portion 29*b* formed in a substantially pawl shape is formed at a lower end portion of the front/rear portion fitting portion 29 so as to contact a front side of the vertical wall portion 19. The portion 28 to be retained for front/rear portion is prevented from disengaging from the vertical wall portion 19 by the engagement of the lip portion 28a and the protrusion portion 29b with the vertical wall portion 19 in a state where the front/rear portion fitting portion 29 is fitted onto the vertical wall portion 19.

The first front/rear portion seal portion 96 is curved to protrude towards the rear side (i.e., towards the peripheral rim end of the movable panel 12) and to have a substantially bow shape in cross section. The first front/rear portion seal portion 96 is connected to a surface of a lower end portion of the front/rear portion fitting portion 29 (portion 28 to be retained for front/rear portion) at a vehicle inner side. Thus, the first front/rear portion seal portion 96 forms a first hollow portion H11 at the forward relative to the vertical wall portion 19 together with the portion 28 to be retained for front/rear portion. The first front/rear portion seal portion 96 elastically deforms, or resiliently deforms so as to overlap with a portion of the front side rim end 12b of the movable panel 12 in a height direction (peripheral rim end of the movable panel) in a state where the movable panel 12 is in the fully closed state, and thus to liquid-tightly contact the portion of the front side rim end 12b.

In a free state (a state where a shape which is once deformed is returned to an original shape because of elasticity), a thickness of the first front/rear portion seal portion 96 gradually reduces from a first front/rear portion end portion 96a corresponding to a base portion provided at an upper end of the portion 28 to be retained for front/rear portion towards an intermediate portion 96b, and the thickness further reduces from the intermediate portion 96b towards a first front/rear portion looped portion (i.e., serving as a first front/rear portion turned back portion) 96c provided at a side facing the front side rim end 12b of the movable panel 12 (peripheral rim end of the movable panel). Further, a thickness of the first front/rear portion seal portion 96 gradually increases from the first front/rear portion looped portion 96c towards a second front/rear portion end portion 96d corresponding to a base portion provided at a lower end portion of the portion 28 to be retained for front/rear portion. Further, a thickness of the second front/rear portion end portion 96d of the first front/rear portion seal portion 96 is smaller than a thickness of the first front/rear portion end portion 96a. A distance L14 in a vehicle height direction from a lower end of the first front/rear portion seal portion 96 to the first front/rear portion looped portion 96c is set to be greater than a distance L13 in a vehicle height direction from an upper end of the first front/rear portion seal portion 96 to the first front/rear portion looped portion 96c.

An edge 28b of the portion 28 to be retained for front/rear portion connected to the first front/rear portion seal portion 96 and provided at a side facing the front side rim end 12b of the movable panel 12 (i.e., peripheral rim end of the movable panel) is positioned closer to the opening end rim 11a of the roof opening portion 11 compared to an edge 29c at a lower end portion of the front/rear portion fitting portion 29 (portion 28 to be retained for front/rear portion) positioned facing the front side rim end 12b of the movable panel 12.

The second front/rear portion seal portion 97 is curved to protrude forward (i.e., towards the opening end rim 11a of the roof opening portion 11) and is formed to have a substantially bow shape in cross section. The second front/rear portion seal portion 97 is connected to a lower end of the front/rear portion fitting portion 29 (portion 28 to be retained for front/rear portion). Thus, the second front/rear portion seal portion 97 forms a second hollow portion H12 at the forward relative to the vertical wall portion 19 together with the portion 28 to be retained for front/rear portion. The second front/mar portion seal portion 97 elastically deforms, or resiliently deforms so as to partially overlap with the opening end rim 11a of the roof opening portion 11 in a vehicle height direction and liquid-tightly contacts the opening end rim 11a of the roof opening portion 11.

In a free state (a state where a shape which is once deformed is returned to an original shape because of elasticity), a thickness of the second front/rear portion seal portion 97 gradually reduces from a third front/rear portion end portion 97a corresponding to a base portion provided at an upper end of the portion 28 to be retained for front/rear portion towards an intermediate portion 97b, and further reduces from the intermediate portion 97b towards a second front/rear portion looped portion (i.e., serving as a second front/rear portion turned back portion) 97c positioned facing the opening end rim 11a of the roof opening portion 11. Further, the second front/rear portion seal portion 97 includes a fourth front/rear portion end portion 97d corresponding to a base portion provided at a lower end of the portion 28 to be retained for front/rear portion, and a portion 97e provided between the second front/rear portion looped portion 97c and the fourth front/rear portion end portion 97d and bent to protrude downwardly to have a substantially V-shape in cross section. A thickness of the fourth front/rear portion end portion 97d is set to be smaller than a thickness of the third front/rear portion end portion 97a. A distance L24 from a lower end of the second front/rear portion seal portion 97 to the second front/rear portion looped portion 97c is set to be greater than a distance L23 from an upper end of the second front/rear portion seal portion 97 to the second front/rear portion looped portion 97c in a vehicle height direction.

An edge 28c provided at an upper end of the portion 28 to be retained for front/rear portion and connected to the second front/rear portion seal portion 97 and provided at a side facing the opening end rim 11a of the roof opening portion 11 is positioned closer to the front side rim end 12b of the movable panel 12 (peripheral rim end of the movable panel) compared to an edge 28d provided at a lower end of the front/rear portion fitting portion 29 (portion 28 to be retained for front/rear portion) connected to the second front/rear portion seal portion 97 and provided at a side facing the opening end rim 11a of the roof opening portion 11.

Structures of the front/rear portion weather strip 22 provided at the rear side is similar to the front/rear portion weather strip 22 provided at the front side, and the structures are explained by replacing the movable panel 12 with the fixed panel 13 and replacing the front and rear directions with rear and front directions, respectively, thus the explanations are not repeated.

An operation of the roof apparatus will be explained as follows.

As described above, the front side link member 50 and the rear side link member 60 are raised to protrude to be a higher level relative to the side-portion weather strip 21 via the clearance C2 (or the clearance C1) in a state where the movable panel 12 is raised relative to the roof opening portion 11 (roof 10) to open the movable panel 12 (roof 10). In those circumstances, the first seal portion 26 of the side-portion weather strip 21 elastically deforms in an upward direction in response to an increase in an amount of a portion that the first seal portion 26 overlaps with the rear side link member 60 (an overlapping amount) in a vehicle height direction.

According to the construction of the embodiment, the thickness of the first seal portion 26 gradually reduces from the first end portion 26a provided at the upper end side of the portion 24 to be retained towards the first looped portion 26c and a thickness of the first seal portion 26 gradually increases from the first looped portion 26c towards the second end portion 26d provided at the lower end portion side of the portion 24 to be retained. The thickness of the second end portion 26d is set to be smaller than the thickness of the first end portion 26a. The distance L12 in the vehicle height direction from the lower end of the first seal portion 26 to the first looped portion 26c is set to be greater than the distance L11 in the vehicle height direction from the upper end of the first seal portion 26 to the first looped portion 26c. Thus, the first looped portion 26c provided facing the vehicle-width-direction rim end 12a of the movable panel 12 (peripheral rim end portion of the movable panel) is likely to be elastically deformed (more readily elastically deformed) compared to the first and second end portions 26a, 26d among the first seal portion 26, and a portion (lower portion) between the second end portion 26d and the first looped portion 26c is likely to be elastically deformed (more readily elastically deformed) compared to a portion (upper portion) between the first end portion 26a and the first looped portion 26c.

Thus, for example, when the front side link member 50 or the rear side link member 60 protrudes in an upward direction through a clearance between the vertical wall portion 15 and the vehicle-width-direction rim end 12a of the movable panel 12 (peripheral rim end of the movable panel) cooperating with (in response to) the rising operation of the movable panel 12 (tilt-up operation, popped-up operation), the first seal portion 26 can be smoothly elastically deformed.

On the other hand, in response to the downward motion of the vehicle-width-direction rim and 12a of the movable panel 12 (peripheral rim end of the movable panel) onto the first seal portion 26, the first seal portion 26 can be elastically deformed smoothly. In those circumstances, because the thickness of the first end portion 26a and an adjacent portion, or adjoining portion of the first end portion 26a are set to be relatively greater and the distance L11 from the upper end of the first seal portion 26 to the first looped portion 26c in the vehicle height direction is set to be relatively small, an elastic deformation in a downward direction can be restrained compared to the second end portion 26d and an adjacent portion of the second end portion 26d.

As explained above, according to the embodiment, the following effects and advantages can be attained.

According to the embodiment, for example, when the front side link member 50 or the rear side link member 60 is protruded in an upward direction from the clearance between the vertical wall portion 15 and the vehicle-width-direction rim end 12a of the movable panel 12 (peripheral rim end of the movable panel), for example, in response to the (in cooperation with) the rising operation of the movable panel 12 (tilt-up operation, popped-up operation), the first seal portion 26 can be smoothly elastically deformed. Thus, the elastic deformation of the first seal portion 26 can be more stabilized, and thus a lifetime of the side-portion weather strip 21 can be increased. On the other hand, when the vehicle-width-direction rim end 12a of the movable panel 12 (peripheral rim end of the movable panel) moves downward onto the first seal portion 26 in response to the downward motion of the movable panel 12, the elastic deformation of the first end portion 26a and the adjacent portion of the first end portion 26a in a downward direction can be restrained compared to the elastic deformation at the second end portion 26d side. Thus, the first seal portion 26 can be elastically deformed at a position closer to the first looped portion 26c so as to liquid-tightly contact the vehicle-width-direction rim end 12a of the movable panel 12 (peripheral rim end of the movable panel), and a liquid-tightness (sealing performance) for preventing infiltration of droplets or raindrops can be enhanced.

According to the construction of the embodiment, the edge 24a provided at the upper end of the portion 24 to be retained and connected to the first seal portion 26 is positioned closer to the opening end rim 11a of the roof opening portion 11 compared to the end 25e provided at the lower end portion of the portion 24 to be retained connected to the first seal portion 26 at the side facing the vehicle-width-direction rim end 12a of the movable panel 12. Thus, when the front side link member 50 and/or the rear side link member 60 protrude upward through the clearance between the vertical wall portion 15 and the vehicle-width-direction rim end 12a of the movable panel 12 in response to the rising operation of the movable panel 12, the elastic deformation of the first seal portion 26 in an upward direction starting from a connecting portion of the first seal portion 26 and the lower end portion of the portion 24 to be retained is assumed to be dominant. Thus, a concentration of stress at the connecting portion of the first seal portion 26 and the upper end portion of the portion 24 can be reduced.

According to the embodiment, the side-portion weather strip 21 can be retained by the guide rail 14 by positioning the vertical wall portion 15 to be sandwiched between the projection portions 25a, 25b of the end portion of the portion 24 to be retained (fitting portion 25), and thus assembling performance of the side-portion weather strip 21 can be enhanced. By sandwiching the vertical wall portion 15 of the guide rail 14 by the projection portions 25a, 25b (i.e., serving as a pair) of the fitting portion 25, the end portion of the portion 24 to be retained can hook (engage) the projection portions 25a, 25b (first and second stopper pawls 25c, 25d) with the vertical wall portion 15 (first and second stopper portions 16, 17) when a force directed in the upward direction is applied to the side-portion weather strip 21. Thus, a disengagement of the side-portion weather strip 21 in the upward direction can be restrained (the side-portion weather strip 21 is prevented from coming off in the upward direction).

Further, according to the construction of the embodiment, the end 25e provided at the lower end portion of the portion 24 to be retained connected to the first seal portion 26 and provided facing the vehicle-width-direction rim and 12a of the movable panel is positioned closer to the opening end rim 11a of the roof opening portion 11 compared to the edge 25f of the fitting portion 25, which is provided facing the vehicle-width-direction rim end 12a of the movable panel 12. Thus, while smoothly performing elastic deformation of the first seal portion 26 in the upward direction when the front side link member 50 or the rear side link member 60 protrude upward, the thickness of the fitting portion 25 (projection portion 25a) is ensured sufficiently and a level of load for disengaging the side-portion weather strip 21 can be increased.

According to the embodiment, a thickness of the second seal portion 27 gradually reduces from the third end portion 27a provided at the upper end side of the portion 24 to be retained towards the second looped portion 27c, and the second seal portion 27 is bent so that the portion provided between the second looped portion 27c and the fourth end portion 27d provided at the lower end side of the portion 24 to be retained protrudes downward. Further, the second seal portion 27 is configured so that the thickness of the fourth end portion 27d is smaller than the thickness of the third end portion 27a, and the distance L22 in the vehicle height direction from the lower end of the second seal portion 27 to the second looped portion 27c is set to be greater than the distance L21 from the upper end of the second seal portion 27 to the second looped portion 27c. Thus, the second looped portion 27c positioned closer to opening end rim 11a of the roof opening portion 11 is more readily elastically deformed than the third and fourth end portions 27a, 27d and adjacent portions thereof among the second seal portion 27, and the portion provided between the fourth end portion 27d and the second looped portion 27c (lower portion) is more readily elastically deformed than the portion provided between the third end portion 27a and the second looped portion 27c (upper portion).

Accordingly, for example, when assembling the side-portion weather strip 21 together with the guide rail 14 from a downward of the roof opening portion 11 relative to the roof opening portion 11, the second seal portion 27 pushed against the opening end rim 11a of the roof opening portion 11 can be smoothly elastically deformed in response to an increase in an overlapping amount with the opening end rim 11a in the vehicle height direction. In those circumstances, because the thickness of the third end portion 27a and the adjacent portion of the third end portion 27a is set to be relatively large and the distance L21 from the upper end of the second seal portion 27 to the second looped portion 27c in the vehicle height direction is set to be relatively small, the elastic deformation in a downward direction can be restrained compared to the second looped portion 27c and the adjacent portion of the second looped portion 27c. Thus, the second seal portion 27 is elastically deformed at the position closer to the second looped portion 27c so as to liquid-tightly contact the opening end rim 11a of the roof opening portion 11, and thus a liquid-tightness (sealing performance) for preventing infiltration of droplets or raindrops can be enhanced. Particularly, when assembling the side-portion weather strip 21, as indicated with double-dash chain line in FIG. 5, allowance for the elastic deformation can be ensured by deforming the portion 27e to be bent in a closing manner to protrude downwardly when elastically deforming the second seal portion 27. Accordingly assembling performance can be enhanced even if a range that the second seal portion 27 and the opening end rim 11a of the roof opening portion 11 overlap with each other sufficiently. As explained above, even if a variation when assembling the weather strip 21 relative to the roof 10 (e.g., roof opening portion 11) is large, the liquid-tightness (sealing performance) for preventing infiltration of droplets and raindrops can be enhanced without undermining the assembling performance of the side-portion weather strip 21.

According to the embodiment, the front/rear portion weather strip 22 can be retained at the front housing 18 by positioning the vertical wall portion 19 of the front housing 18 into the front/rear portion fitting portion 29 in a sandwiching manner, and thus the assembling performance can be enhanced. Then, the portion 28 to be retained for front/rear portion restrains the front/rear portion weather strip 22 from coming off in the upward direction from the vertical wall portion 19 which does not have a recess or projection by hooking, for example, the lip portion 28a onto the vertical wall portion 19 of the front housing 18.

According to the embodiment, the thickness of the first front/rear portion seal portion 96 gradually reduces from the first front/rear portion end portion 96a provided at the upper end of the portion 28 to be retained for front/rear portion towards the first front/rear portion looped portion 96c, and gradually increases from the first front/rear portion looped portion 96c towards the second front/rear portion end portion 96d provided at the lower end of the portion 28 to be retained for front/rear portion. Further, the thickness of the second front/rear portion end portion 96d is set to be smaller than the thickness of the first front/rear portion end portion 96a among the first front/rear portion seal portion 96, and the distance L14 in the vehicle height direction from the lower end of the first front/rear portion seal portion 96 towards the first front/rear portion looped portion 96c is set to be greater than the distance L13 in the vehicle height direction from the first front/rear portion seal portion 96 towards the first front/rear portion looped portion 96c. Thus, the first front/rear portion looped portion 96c provided facing the front side rim end 12b of the movable panel 12 (facing the peripheral rim end of the movable panel 12) is more readily elastically deformed than the first and second front/rear portion end portions 96a, 96d and adjacent portions thereof among the first front/rear portion seal portion 96. The portion (lower portion) provided between the second front/rear portion end portion 96d and the first front/rear portion looped portion 96c is more readily elastically deformed compared to the portion (upper portion) provided between the first front/rear portion end portion 96a and the first front/rear portion looped portion 96c.

Thus, when the front side rim end 12b of the movable panel 12 moves downward onto the first front/rear portion seal portion 96, for example, in response to the downward operation of the movable panel 12, the first front/rear portion seal portion 96 can be smoothly elastically deformed. In those circumstances, because the thickness of the first front/rear portion end portion 96a and the adjacent portion of the first front/rear portion end portion 96a is set to be relatively large and the distance L13 in the vehicle height direction from the upper end of the first front/rear portion seal portion 96 to the first front/rear portion looped portion 96c is relatively small, the elastic deformation at the first front/rear portion end portion 96a and the adjacent portion thereof in the downward direction can be restrained compared to the first front/rear portion looped portion 96c. Accordingly, the first front/rear portion seal portion 96 can be elastically deformed at the position closer to the first front/rear portion looped portion 96c so as to liquid-tightly contact the front side rim end 12b of the movable panel 12, and thus liquid-tightness (sealing performance) for preventing infiltration of the droplets and raindrops can be enhanced.

On the other hand, the thickness of the second front/rear portion seal portion 97 gradually reduces from the third front/rear portion end portion 97a provided at the upper end side of the portion 28 to be retained for front/rear portion towards the second front/rear portion looped portion 97c, and the second front/rear portion seal portion 97 is bent so that the portion provided between the second front/rear portion looped portion 97c and the fourth front/rear portion end portion 97d provided at the lower end side of the portion 28 to be retained for front/rear portion protrudes downward. Further, the thickness of the fourth front/rear portion end portion 97d is set to be smaller than the thickness of the third front/rear portion end portion 97a among the second front/rear portion seal portion 97, and the distance L24 in the vehicle height direction from the lower end of the second front/rear portion seal portion 97 to the second front/rear portion looped portion 97c is set to be greater than the distance L23 in the vehicle height direction from the upper end of the second front/rear portion seal portion 97 to the second front/rear portion looped portion 97c. Accordingly, the second front/rear portion looped portion 97c provided facing the opening end rim 11a of the roof opening portion 11 is more readily deformed compared to the third and fourth front/rear portion end portions 97a, 97d and adjacent portions thereof among the second front/rear portion seal portion 97. The portion (lower portion) provided between the fourth front/rear portion end portion 97d and the second front/rear portion looped portion 97c is more readily deformable compared to the portion (upper portion) provided between the third front/rear portion end portion 97a and the second front/rear portion looped portion 97c.

Accordingly, for example, when assembling the front/rear portion weather strip 22 together with the front housing 18 from the downward of the roof opening portion 11 relative to the roof opening portion 11, the second front/rear portion seal portion 97 pushed by the opening end rim 11a of the roof opening portion 11 is assumed to be smoothly elastically deformable in response to an increase in an overlapping amount with the opening end rim 11a in the vehicle height direction. In those circumstances, the thickness of the third front/rear portion end portion 97a and the adjacent portion of the third front/rear portion end portion 97a is set to be relatively large, and the distance L23 in the vehicle height direction from the upper end of the second front/rear portion seal portion 97 to the second front/rear portion looped portion 97c is set to be relatively small, thus to restrain the elastic deformation of the third front/rear portion end portion 97a and the adjacent portion thereof in the downward direction compared to the second front/rear portion looped portion 97c and an adjacent portion of the second front/rear portion looped portion 97c. Thus, the second front/rear portion seal portion 97 can be elastically deformed at the position closer to the second front/rear portion looped portion 97c so as to liquid-tightly contact the opening end rim 11a of the roof opening portion 11, thus to enhance the liquid-tightness (sealing performance) for preventing infiltration of the droplets or raindrops. Particularly, when assembling the front/rear portion weather strip 22, the allowance for the elastic deformation can be ensured by deforming the portion which is to be bent to protrude downwardly when the second front/rear portion seal portion 97 elastically deforms in closing manner, and the assembling performance can be enhanced even if the range of the second front/rear portion seal portion 97e overlapping with the opening end rim 11a of the roof opening portion 11 is sufficiently ensured. As explained above, even if the variation when assembling onto the roof 10 is large (roof opening portion 11), the liquid-tightness (sealing performance) for preventing infiltration of the droplet or the raindrops can be enhanced without impairing (undermining) the assembling performance of, for example, the front/rear portion weather strip 22.

According to the embodiment, the cross sectional configurations of the first front/rear portion seal portion 96 and the second front/rear portion seal portion 97 of the front/rear portion weather strip 22 are common to the configurations of the first seal portion 26 and the second seal portion 27, respectively. Thus, for example, common dies can be applied for a part of dies for forming (extrusion molding) the first front/rear portion seal portion 96 and the second front/rear portion seal portion 97 on the portion 28 to be retained for front/rear portion, which allows to reduce the number of the dies.

According to the embodiment, by restraining the elastic deformation of the first end portion 26a of the first seal portion 26 and the adjacent portion of the first end portion 26a in an downward direction compared to the second end portion 26d and the adjacent portion thereof, a range of a recess generated at a border portion between the first seal portion 26 and the vehicle-width-direction rim end 12a of the movable panel 12 in response to the elastic deformation of the first seal portion 26 can be reduced, thus design (appearance) can be enhanced. Particularly, because a portion (design surface) which is visible from an upward of the side-portion weather strip 21 is only the first and second seal portions 26, 27 which are made from the same material (sealing member), the appearance can be further improved.

According to the embodiment, by restraining the elastic deformation of the first front/rear portion end portion 96a of the first front/rear portion seal portion 96 and the adjacent portion of the first front/rear portion end portion 96a in a downward direction compared to the elastic deformation of the second front/rear portion end portion 96d and the adjacent portion thereof, a range of a recess generated at a border portion between the front side rim end 12b of the movable panel 12 and the first front/rear portion seal portion 96 in response to the elastic deformation of the first front/rear portion seal portion 96 can be reduced, and appearance can be improved. Particularly, because only first and second front/rear portion seal portions 96, 97 which are made from the same material (sealing member) correspond to a portion (design surface) which is visible from an upward of the front/rear portion weather strip 22, an appearance can be further improved.

According to the embodiment, by retaining the movable panel 12 on the guide rail 14 by means of the front side link member 50 and the rear side link member 60, which serves as a pair provided at the forward and rearward, during a sliding operation of the movable panel 12, rigidity for retaining the movable panel 12 can be enhanced.

According to the embodiment, because the side-portion weather strip 21 is attached to the guide rail 14, it is not necessary to attach the weather strip, for example, to the roof 10 side (body side). Similarly, because the front/rear portion weather strip 22 at the front side is attached to the front housing 18, it is not necessary to attach the weather strip, for example, to the roof 10 side (body side). Thus, for example, man-hour for assembling and control in a vehicle plant can be reduced regarding the side-portion weather strip 21 and the front/rear portion weather strip 22. Further, there is no release paper of double-faced adhesive tape to be disposed according to the construction of the embodiment whereas release papers of double-faced adhesive tape need to be disposed when the side-portion weather strip 21 or the front/rear portion weather strip 22 are adhered to the roof 10 side (body side), for example, by the double-faced adhesive tape.

Figure 11:
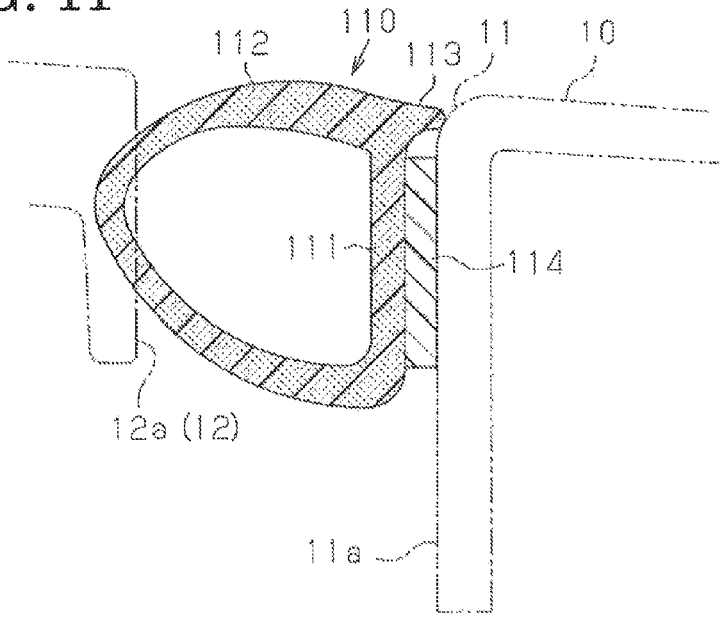
FIG. 11 is a lateral cross-sectional view showing a modified example of a weather strip according to the embodiment disclosed here.
Figure 12:
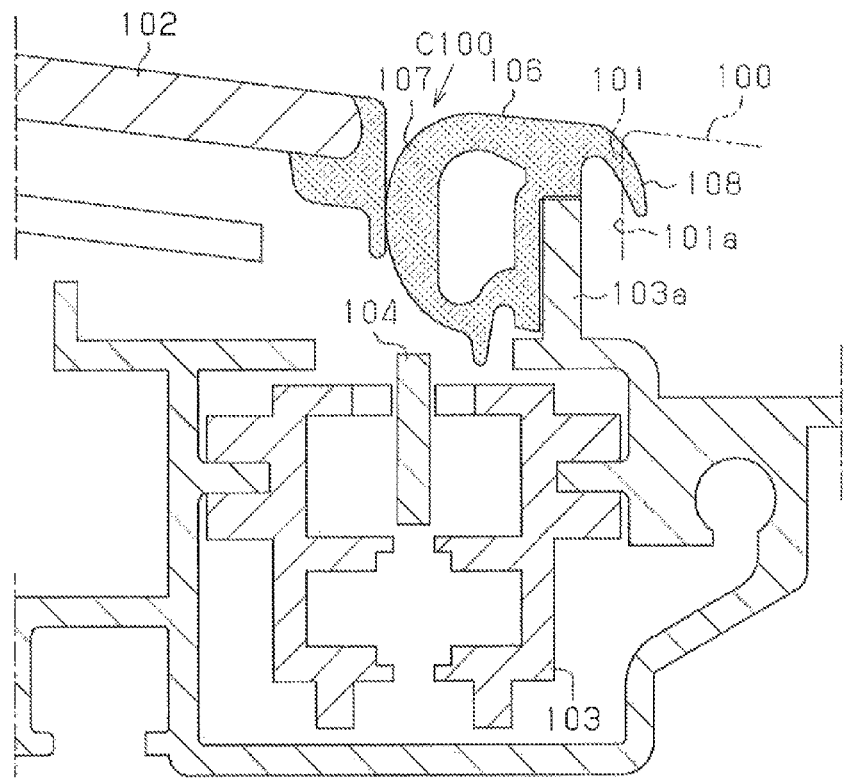
FIG. 12 is a lateral cross-sectional view showing a known construction of roof apparatus.

According to the embodiment, the side-portion weather strip 21 is attached to a unit side (guide rail 14) of the sunroof apparatus. Alternatively, as shown in FIG. 11, a side-portion weather strip (i.e., serving as a weather strip) 110 may be attached to the body side (opening end rim 11a). That is, the side-portion weather strip 110 includes a portion 111 to be retained which is retained by the opening end rim 11a of the roof opening portion 11. Further, the side-portion weather strip 110 includes a first seal portion 112 and a second seal portion 113 which is formed in a tongue piece shape (i.e., non-hollow configuration) which are connected to an upper end of the portion 111 to be retained and liquid-tightly contact the vehicle-width-direction rim end 12a of the movable panel 12 and the opening end rim 11a of the roof opening portion 11 when the movable panel 12 is in a fully closed state. The side-portion weather strip 110 is adhered to (secured to) the opening end rim 11a of the roof opening portion 11 via a double-faced adhesive tape 114 at the portion 111 to be retained. The first seal portion 112 includes a cross-sectional configuration similar to the first seal portion 26 (or the first front/rear portion seal portion 96).

Further, the front/rear portion weather strip 22 may be formed in a configuration similar to the side-portion weather strip 110 to be attached to the body side (opening end rim 11a). According to the embodiment, the single lip portion 28a is provided at the portion 28 to be retained for front/rear portion of the front/rear portion weather strip 22. Alternatively, plural lip portions 28a may be provided. Further alternatively, the lip portion 28a may be omitted and the front/rear portion fitting portion 29 of the front/rear portion weather strip 22 may be fitted to the vertical wall portion 19. Further, alternatively, the front/rear portion fitting portion 29 of the front/rear portion weather strip 22 may be omitted and the portion 28 to be retained for front/rear portion may be adhered to (secured to) the vertical wall portion 19 by means of the double-faced adhesive tape.

A configuration of the front/rear portion weather strip 22 may be changed. For example, cross-sectional configurations of the first and second front/rear portion seal portions 96, 97 may be different from configurations of the first and second seal portions 26, 27, respectively.

According to an alternative construction, the end 25e arranged at the lower end portion of the portion 24 to be retained connected to the first seal portion 26, the end 25e facing the vehicle-width-direction rim end 12a of the movable panel 12 may not be positioned closer to the opening end rim 11a of the roof opening portion 11 compared to the edge 25f of the fitting portion 25 facing the vehicle-width-direction rim end 12a of the movable panel 12. Further, according to an alternative construction, the first and second stopper pawls 25c, 25d of the side-portion weather strip 21 (fitting portion 25) may be omitted and the fitting portion 25 may be fitted to the vertical wall portion 15. Further, according to an alternative construction, the fitting portion 25 of the side-portion weather strip 21 may be omitted, and, for example, the portion 24 to be retained may be adhered to (secured to) the vertical wall portion 15 by means of a double-faced adhesive tape.

According to an alternative construction, the edge 24a provided at the upper end of the portion 24 to be retained and connected to the first seal portion 26 may not be positioned closer to the opening end rim 11a of the roof opening portion 11 compared to the end 25e provided at the lower end portion of the portion 24 to be retained connected to the first seal portion 26, the end 25e facing the vehicle-width-direction rim end 12a of the movable panel 12.

Materials for the portion 24, 28 to be retained is not limited to resin member (including rubber member), and materials for the first seal portion 26, 96 and the second seal portion 27, 97 are not limited to the sponge member as long as being softer than the portion 24, 28 to be retained, and for example, the first seal portion 26, 96 and the second seal portion 27, 97 may be made from resin member including rubber member.

According to the embodiment, the front side link member 50 and the rear side link member 60 move upwards and downwards in the vehicle height direction to protrude or retract relative to the side-portion weather strip 21 while elastically deforming the side-portion weather strip 21 in response to an up-down operation of the movable panel 12. Alternatively, for example, a masking plate for masking a clearance formed between the roof 10 and the movable panel 12 when viewed from a lateral surface or an arm portion of a wind deflector may be applied as a cooperating member which moves upward and downward in the vehicle height direction to protrude or retract in response to the upward and downward operation (opening and closing operation) of the movable panel 12. Namely, a member which does not slide the side-portion weather strip 21 (motion in the front-rear direction) in response to the sliding operation of the movable panel 12 may be applied as the cooperating member according to the alternative construction.

According to an alternative construction, a cooperating member moves upward and downward in a vehicle height direction to protrude or retract while elastically deforming the front/rear portion weather strip 22 in response to the upward and downward operation of the movable panel 12. In those circumstances, for example, when the cooperating member moves upward through a clearance between the front side rim end 12b of the movable panel 12 and the front housing 18 (vertical wall portion 19) in response to the upward and downward operation of the movable panel 12, the first front/rear portion seal portion 96 can be smoothly elastically deformed accordingly. Thus, the elastic deformation of the first front/rear portion seal portion 96 can be performed more stably, and thus a lifetime of the front/rear portion weather strip 22 can be increased.

An example of linkages among the driving shoe 40, the front side link member 50 and the rear side link member 60 are disclosed in the embodiment. Alternatively, for example, guide grooves which are arranged in reversal directions relative to the first groove portion 42 and the second groove portion 43 may be formed at the front side link member 50 and the rear side link member 60, respectively, and a front side engagement pin and a rear side engagement pin which are movably fitted into the guide grooves, respectively, may be secured to the driving shoe 40.

According to the embodiment, a movable panel which performs a slide operation while maintaining a tilted-up state or a movable panel which only performs a tilt-up and tilt-down operation (i.e., which does not slide) may be applicable.

In place of the fixed panel 13, for example, a movable panel which performs a tilt-up operation may be adopted.

According to the construction of the disclosure, the roof apparatus includes the movable panel (12) moving upward and downward relative to an opening portion (11) formed on the roof portion (10) of a vehicle for opening and closing the opening portion (11), the weather strip (21, 110) retained at a retaining member (14) provided at the roof portion (10), the cooperating member (50, 60) moving upward and downward in a vehicle height direction in response to an upward and downward operation of the movable panel (12) to protrude and retract through a clearance between a peripheral rim end (12a) of the movable panel (12) and the retaining member (14), and the weather strip (21, 110) including a portion (24, 111) to be retained being retained by the retaining member (14), a first seal portion (26, 112) which is connected to an upper end of the portion (24, 111) to be retained and liquid-tightly contacts the peripheral rim end (12a) of the movable panel (12) in a state where the movable panel (12) is in a fully closed state, and a second seal portion (27, 113) which is connected to an upper end of the portion (24, 111) to be retained and liquid-tightly contacts an opening end (11a) of the opening portion (11) in the state where the movable panel (12) is in the fully closed state. The first seal portion (26, 112) is connected to a lower end portion of the portion (24, 111) to be retained, a thickness of the first seal portion (26, 112) gradually reduces from a first end portion (26a) positioned at an upper end side of the portion (24, 111) to be retained towards a first turned back portion (26c) provided facing the peripheral rim end (12a) of the movable panel (12), the thickness of the first seal portion (26, 112) gradually increases from the first turned back portion (26c) towards a second end portion (26d) provided at a lower end portion of the portion (24, 111) to be retained, a thickness of the second end portion (26d) is set to be smaller than a thickness of the first end portion (26a), and a distance in a vehicle height direction from a lower end of the first seal portion (26) to the first turned back portion (26c) is set to be greater than a distance in the vehicle height direction from an upper end of the first seal portion (26) to the first turned back portion (26c).

According to the construction of the disclosure, the thickness of the first se portion (26) gradually reduces from the first end portion (26a) provided at the upper end of the portion (24) to be retained towards the first turned back portion (first looped portion 26c), the thickness of the first seal portion (26) gradually reduces from the first turned back portion (first looped portion 26c) towards the second end portion (26d) provided at the lower end portion of the portion (24) to be retained. Further, the thickness of the second end portion (26d) is set to be smaller than the first end portion (26a), and the distance in the vehicle height direction from the lower end of the first seal portion (26) to the first turned back portion (first looped portion 26c) is set to be greater than the distance in the vehicle height direction from the upper end of the first seal portion (26a) to the first turned back portion (first looped portion 26c) among the first seal portion (26). Accordingly, the first seal portion (26) more readily elastically deforms at the first turned back portion (first looped portion 26c) provided facing the peripheral rim end of the movable panel (12) compared to at the first and second end portions (26a, 26d), and a portion (lower portion) between the second end portion and the first turned back portion (first looped portion 26c) is likely to elastically deform more readily compared to a portion (upper portion) between the first end portion (26a) and the first turned back portion (first looped portion 26c).

Thus, for example, in a state where the cooperating member (front side link member 50, rear side link member 60) protrudes upward through the clearance between the peripheral rim end of the movable panel (12) and the retaining member (guide rail 14) in response to an upward operation of the movable panel (12), the first seal portion (26, 112) is smoothly elastically deformed. Accordingly, the elastic deformation of the first seal portion (26, 112) is stabilized, and a lifetime of the weather strip is elongated.

On the other hand, when the peripheral end rim of the movable panel (12) moves downward onto the first seal portion (26, 112) in response to a downward operation of the movable panel (12), the first seal portion (26, 112) can be smoothly elastically deformed accordingly. In those circumstances, the thickness of the first end portion (26a) and the vicinity, or adjacent portion of the first end portion (26a) is set to be relatively large, and the distance in the vehicle height direction from the first seal portion (26a) to the first turned back portion (first looped portion 26c) is relatively small, thus, the elastic deformation in a downward direction of the first end portion (26a) and the adjacent portion of the first end portion (26a) can be restrained compared to the elastic deformation at the first turned back portion (first looped portion 26c). Thus, the first seal portion (26) is elastically deformed at the position closer to the first turned back portion (first looped portion 26c) so as to liquid-tightly contact the peripheral rim end (12a) of the movable panel (12), and thus the liquid-tightness (sealing performance) for preventing infiltration of the droplets or raindrops can be enhanced.

According to the construction of the disclosure, the edge (24a) which is provided at an upper end portion of the portion (24) to be retained connected to the first seal portion (26) and provided facing the peripheral rim end (12a) of the movable panel (12), is positioned closer to the opening end (11o) of the opening portion (11) compared to an end (25e) which is provided at a lower end portion of the portion (24) to be retained connected to the first seal portion (26) and provided facing the peripheral rim end (12a) of the movable panel (12).

According to the construction of the disclosure, when the cooperating member (front side link member 50, rear side link member 60) protrudes upward through the clearance between the peripheral rim end (12a) of the movable panel (12) and the retaining member (guide rail 14) in response to the upward operation of the movable panel (12), the elastic deformation in the upward direction starting from a connecting portion of the first seal portion (26) and the lower end portion of the portion (24) to be retained is assumed to be dominant among the elastic deformation of the first seal portion (26). Accordingly, the concentration of the stress at the connecting portion of the first seal portion (26) and the upper end portion of the portion (24) to be retained can be reduced.

According to the construction of the disclosure, the portion (24) to be retained includes a fitting portion (25) including a pair of projection portions (25a, 25b) sandwiching a vertical wall portion (15) of the retaining member (14) at a side facing the peripheral rim end of the movable panel (12) and at a side facing the opening end (11a) of the opening portion (11). The end (25e) which is provided at the lower end portion of the portion (24) to be retained connected to the first seal portion (26) and provided facing the peripheral rim end of the movable panel (12) is positioned closer to the opening end (11a) of the opening portion (11) compared to an edge (25f) of the fitting portion (25) provided facing the peripheral rim end (12a) of the movable panel (12).

According to the construction of the disclosure, by fitting the vertical wall portion (15) in a sandwiching manner between the projection portions (25a, 25b), which serve as a pair, of the portion (24) to be retained (fitting portion (25)), the weather strip (21) can be retained by the retaining member (guide rail 14), and the assembling performance can be enhanced. Then, by sandwiching the vertical wall portion (15) of the retaining member (guide rail 14) by the projections (25a, 25b), which serve as a pair, of the fitting portion (25), the portion (24) to be retained allows to hook, or engage the projection portions (25a, 25b) with the vertical wall portion (15) when a force directed in the upward direction is applied to the weather strip (21). Thus, disengagement of the weather strip (21) in the upward direction can be restrained. Further, by positioning the end (25e) of the lower end portion of the portion (24) to be retained which is connected to the first seal portion (26) and is provided facing the peripheral rim end of the movable panel (12) to be closer to the opening end (opening end rim 11a) of the opening portion (11) compared to the edge (25f) of the fitting portion (25) provided facing the peripheral rim end of the movable panel (12), a thickness of the fitting portion (25) is sufficiently ensured and the a level of load for disengaging the weather strip (21) can be increased while allowing a smooth elastic deformation of the first seal portion (26) in the upward direction when the cooperating member (front side link member 50, rear side link member 60) protrudes upward.

According to the construction of the disclosure, the second seal portion (27) is connected to a lower end of the portion (24) to be retained, a thickness of the second seal portion (27) gradually reduces from a third end portion (27a) provided at an upper end side of the portion (24) to be retained towards a second turned back portion (27c) provided facing the opening end (11a) of the opening portion (11). The second seal portion (27) is bent to protrude a portion (21e) provided between a fourth end portion (27d) provided at a lower end of the portion (24) to be retained and the second turned back portion (27c) in a downward direction. A thickness of the fourth end portion (27d) is set to be smaller than a thickness of the third end portion (27a). A distance in a vehicle height direction from a lower end of the second seal portion (27) to the second turned back portion (27c) is set to be greater than a distance in a height direction from an upper end of the second seal portion (27) to the second turned back portion (27c). The edge (24b) which is provided at an upper end of the portion (24) to be retained connected to the second seal portion (27) and provided facing the opening end (11a) of the opening portion

(11) is positioned closer to the peripheral rim end (12a) of the movable panel (12) compared to an end (25g) which is provided at a lower end of the portion (24) to be retained connected to the second seal portion (27) and provided facing the opening end (11a) of the opening portion (11).

According to the construction of the disclosure, the thickness of the second seal portion (27) gradually reduces from the third end portion (27a) provided at the upper end side of the portion (24) to be retained towards the second turned back portion (second looped portion 27c), and the portion (27e) provided between the second turned back portion (second looped portion 27c) and the fourth end portion (27d) is bent to protrude in a downward direction. Further, the thickness of the third end portion (27a) of the second seal portion (27) is set to be smaller than the thickness of the fourth end portion (27d), and the distance in the height direction from the lower end of the second seal portion (27) to the second turned back portion (second looped portion 27c) is set to be greater than the distance in the height direction from the upper end of the second seal portion (27) to the second turned back portion (second looped portion 27c). Accordingly, the second turned back portion (second looped portion 27c) positioned closer to the opening end (opening end rim 11a) of the opening portion (11) is more readily elastically deformed among the second seal portion (27) compared to the third end portion (27a) and the fourth end portion (27d), and a portion (lower portion) between the fourth end portion (27d) and the second turned back portion (second looped portion 27c) is more readily elastically deformed compared to a portion (upper portion) between the third end portion (27a) and the second turned back portion (second looped portion 27c).

Thus, for example, when assembling the weather strip (21) together with the retaining member (guide rail 14) to the opening portion (11) from the bottom, the second seal portion (27) pushed by the opening end (opening end rim 11a) of the opening portion (11) is smoothly elastically deformed. In those circumstances, by setting the thickness of the third end portion (27a) and the adjacent portion of the third end portion (27a) is set to be relatively large and by setting the distance in the vehicle height direction from the upper end of the second seal portion (27) to the second turned back portion (second looped portion 27c) to be relatively small, the elastic deformation in the downward direction can be restrained compared to the second turned back portion (second looped portion 27c) and the adjacent portion thereof. Thus, the second seal portion (27) can be elastically deformed at the position closer to the second turned back portion (second looped portion 27c) and the adjacent portion thereof thus to liquid-tightly contact the opening end (opening end rim 11a) of the opening portion (11), and the liquid-tightness (sealing performance) for preventing infiltration of droplets or raindrops can be enhanced. Particularly, when assembling, for example, the weather strip (21), the allowance of the elastic deformation can be ensured by a construction deforming the portion bent to protrude in the downward direction in a closing manner when the second seal portion (27) is elastically deformed, the assembling performance can be enhanced even if an overlapping range of the second seal portion (27) and the opening end (opening end rim 11a) of the opening portion (11) is sufficiently ensured. Accordingly, even if variation for assembling the weather strip (21) relative to the roof portion (e.g., opening portion) is large, the liquid-tightness (sealing performance) for preventing infiltration of droplets or raindrops can be enhanced without impairing, or deteriorating the assembling performance of the weather strip (21), for example.

According to the disclosure, the weather strip (21, 110) corresponds to a pair of side-portion weather strips (21, 110) provided at vehicle-width-direction rim portions of the roof portion (10) positioned opposite to each other. The roof apparatus includes a pair of front/rear portion weather strips (22) extending in a vehicle width direction, connecting front ends of the side-portion weather strips (21, 110), and connecting rear ends of the side-portion weather strips (21, 110) via corner portions (23), respectively, the front/rear portion weather strip (22) including a portion (28) to be retained for front/rear portion made from a resin member and retained by a front/rear portion retaining member (18) provided at the roof portion (10), and a first front/rear portion seal portion (96) and a second front/rear portion seal portion (97) each made from a sealing member which is softer than the resin member that the portion (28) to be retained for front/rear portion is made from, the first front/rear portion seal portion (96) and the second front/rear portion seal portion (97) being connected to a top end of the portion (28) to be retained for front/rear portion, the first front/rear portion seal portion (96) and the second front/rear portion seal portion (97) liquid-tightly contacting the peripheral rim end of the movable panel (12) and the opening end (11a) of the opening portion (11), respectively, when the movable panel is fully closed. The first front/rear portion seal portion (96) is connected to a lower end portion of the portion (28) to be retained for front/rear portion, a thickness of the front/rear portion seal portion (96) gradually reduces from a first front/rear portion end portion (96a) provided at an upper end of the portion (28) to be retained for front/rear portion towards a first front/rear portion turned back portion (96c) provided facing the peripheral rim end of the movable panel (12), the thickness of the first front/rear portion seal portion (96) gradually increases from the first front/rear portion turned back portion (96c) towards a second front/rear portion end portion (96d) provided at a lower end portion of the portion (28) to be retained for front/rear portion, a thickness of the second front/rear portion end portion (96d) is set to be smaller than a thickness of the first front/rear portion end portion (96a), and a distance (14) in a vehicle height direction from a lower end of the first front/rear portion seal portion (96) to the first front/rear portion turned back portion (96c) is set to be greater than a distance (L13) in a vehicle height direction from an upper and of the first front/rear portion seal portion (96) to the first front/rear portion turned back portion (96c). The second front/rear portion seal portion (97) is connected to a lower end of the portion (28) to be retained for front/rear portion, a thickness of the second front/rear portion seal portion (97) gradually reduces from a third front/rear portion end portion (97a) provided at an upper end of the portion (28) to be retained for front/rear portion towards a second front/rear portion turned back portion (97c) provided facing the opening end (11a) of the opening portion (11), the second front/rear portion seal portion (97) is bent so that a portion (97e) provided between the second front/rear portion turned back portion (97c) and a fourth front/rear portion end portion (97d) provided at a lower end of portion (28) to be retained for front/rear portion protrudes downward, a thickness of the fourth front/rear portion end portion (97d) is set to be smaller than a thickness of the third front/rear portion end portion (97a), a distance (L24) in a vehicle height direction from a lower end of the second front/rear portions seal portion (97) to the second front/rear portion turned back portion (97c) is set to be greater than a distance (L23) in a vehicle height direction from an upper end of the second front/rear portion seal portion (97) to the second front/rear portion turned back portion (97). The edge (28c) provided at an upper end of the portion (28) to be retained for front/rear portion connected to the second front/rear portion seal portion (97), and provided facing the opening end (11m)

of the opening portion (11) is positioned closer to the peripheral end rim (12a) of the movable panel (12) compared to an edge (28d) provided at a lower end of the portion (28) to be retained for front/rear portion connected to the second front/rear portion seal portion (97) and provided facing the opening end (11a) of the opening portion (11).

According to the construction of the disclosure, the thickness of the first front/rear portion seal portion (96) gradually reduces from the first front/rear portion end portion (96a) provided at the upper end side of the portion (28) to be retained for front/rear portion towards the first front/rear portion turned back portion (first front/rear portion looped portion 96c), and the thickness of the first front/rear portion seal portion (96) gradually increases from the first front/rear portion turned back portion (first front/rear portion looped portion 96c) towards the second front/rear portion end portion (96d) provided at the lower end portion of the portion (28) to be retained for front/rear portion. Further, the thickness of the second front/rear portion end portion (96d) of the first front/rear portion seal portion (96) is set to be smaller than the thickness of the first front/rear portion end portion (96a), and the distance in the vehicle height direction from the lower end of the first front/rear portion seal portion (96) to the first front/rear portion turned back portion (first front/rear portion looped portion 96c) is set to be greater than the distance in the vehicle height direction from the upper end of the first front/rear portion seal portion (96) to the first front/rear portion turned back portion (first front/rear portion looped portion 96c). Accordingly, the first front/rear portion seal portion (96) is more readily elastically deformed at the first front/rear portion turned back portion (first front/rear portion looped portion 96c) provided facing the peripheral rim end of the movable panel (12) compared to the first and second front/rear portion end portions and adjacent portions thereof, and a portion (lower portion) between the second front/rear portion end portion (96d) and the first front/rear portion turned back portion (first front/rear portion looped portion 96c) is more readily elastically deformable compared to a portion (upper portion) provided between the first front/rear portion end portion (96a) and the first front-rear position turned back portion (first front/rear portion looped portion 96c).

Thus, when the peripheral rim end of the movable panel (12) moves downward onto the first front/rear portion seal portion (96) in response to, for example, the downward operation of the movable panel (12), the first front/rear portion seal portion (96) can be smoothly elastically deformed. In those circumstances, because the thickness of the first front/rear portion end portion (96) and the adjacent portion thereof is set to be relatively large, and the distance in the vehicle height direction from the upper end of the front/rear portion seal portion (96) to the first front/rear portion turned back portion (first front/rear portion looped portion 96c) is set to be relatively small, the downward elastic deformation of the first front/rear portion seal portion (96) and the adjacent portion thereof can be restrained compared to the first front/rear portion turned back portion (first front/rear portion looped portion 96c) and the adjacent portion of the first front/rear portion turned back portion (first front/rear portion looped portion 96c). Accordingly, the first front/rear portion seal portion (96) is elastically deformed at the position closer to the first front/rear portion turned back portion (first front/rear portion looped portion 96c) and the adjacent portion thereof thus to liquid-tightly contact the peripheral rim end of the movable panel (12), and the liquid-tightness (sealing performance) for preventing infiltration of droplets or raindrops can be enhanced.

On the other hand, the thickness of the second front/rear portion sealing portion (97) gradually reduces from the third front/rear portion end portion (97a) provided at the upper end of the portion (28) to be retained for front/rear portion towards the second front/rear portion turned back portion (second front/rear portion looped portion 97c), and the second front/rear portion sealing portion (97) is bent so that the portion (97e) provided between the second front/rear portion turned back portion (second front/rear portion looped portion 97c) and the fourth front/rear portion end portion (97d) provided at the lower end side of the portion (28) to be retained for front/rear portion protrudes downwardly. Further, the thickness of the fourth front/rear portion end portion (97d) is set to be smaller than the thickness of the third front/rear portion end portion (97a) among the second front/rear portion seal portion (97), and the distance in the vehicle height direction from the lower end of the second front/rear portion seal portion (97) to the second front/rear portion turned back portion (second front/rear portion looped portion 97c) is set to be greater than the distance in the vehicle height direction from the upper end of the second front/rear portion seal portion (97) to the second front/rear portion turned back portion (second front/rear portion looped portion 97c). Thus, the second front/rear portion turned back portion (second front/rear portion looped portion 97c) provided closer to the opening end (opening end rim 11a) of the opening portion (11) is more readily deformable among the second front/rear portion seal portion (97) compared to the third and fourth front/rear portion end portions (97a, 97d), and a portion (lower portion) provided between the fourth front/rear portion end portion (97d) and the second front/rear portion turned back portion (second front/rear portion looped portion 97c) is more readily deformable compared to a portion (upper portion) provided between the third front/rear portion end portion (97a) and the second front/rear portion turned back portion (second front/rear portion looped portion 97c).

Thus, for example, when assembling the front/rear portion weather strip together with the front/rear portion retaining member (front housing 18) to the opening portion (11) from the bottom, the second front/rear portion seal portion (97) pushed by the opening end (opening end rim 11a) of the opening portion (11) can be smoothly elastically deformed. In those circumstances, because the thickness of the third front/rear portion end portion (97a) and the adjacent portion of the third front/rear portion end portion (97a) is set to be relatively large, and the distance in the vehicle height direction from the upper end of the second front/rear portion seal portion (97) to the second front/rear portion turned back portion (second front/rear portion looped portion 97c) is set to be relatively small, the downward elastic deformation of the third front/rear portion end portion (97a) and the adjacent portion thereof can be restrained compared to the second front/rear portion turned back portion (second front/rear portion looped portion 97c) and the adjacent portion thereof. Accordingly, the second front/rear portion seal portion (97) can be elastically deformed at the position closer to the second front/rear portion turned back portion (second front/rear portion looped portion 97c) and the adjacent portion thereof thus to liquid-tightly contact the opening end (11a) of the opening portion (11), and liquid-tightness (sealing performance) for preventing infiltration of droplets or raindrops can be enhanced. Particularly, when assembling, for example, the front/rear portion weather strip (22), the allowance of the elastic deformation can be ensured by a construction deforming the portion to be bent to protrude in the downward direction in a closing manner when elastically deforming the second front/rear portion seal portion (97), and assembling performance can be enhanced even if an overlapping range of the second front/rear portion seal portion (97) and the opening end (11*a*) of the opening portion (11) is sufficiently ensured.

Accordingly, provided that the variation when assembling the front/rear portion weather strip relative to the roof portion (e.g., opening portion) is large, the liquid-tightness (sealing performance) for preventing infiltration of droplets or raindrops can be enhanced without impairing, or deteriorating the assembling performance of the front/rear portion weather strip, for example.

According to the disclosure, the portion (28) to be retained for front/rear portion includes a front/rear portion fitting portion (29) sandwiching a vertical wall portion (19) of the front/rear portion retaining member (18) at a side facing the peripheral rim end (12*a*) of the movable panel (12) and at a side facing the opening end (11*a*) of the opening portion (11), and at least one lip portion (28*a*) configured to be engaged with the vertical wall portion (19) of the front/rear portion retaining member (18).

According to the construction of the disclosure, the front/rear portion weather strip (22) can be retained by the front/rear portion retaining member (front housing 18) by fitting the vertical wall portion (19) of the front/rear portion retaining member (18) to the front/rear portion fitting portion (29), the assembling performance of the front/rear portion weather strip (22) can be enhanced. Then, the portion (28) to be retained for front/rear portion can restrain the disengagement (dislocation) of the front/rear portion weather strip (22) in an upward direction by hooking, or engaging the lip portion (28*a*) with the vertical wall portion (19) of the front/rear portion retaining member (front housing 18).

According to the disclosure, the first seal portion (26, 112) is configured to liquid-tightly contact the peripheral end rim (12*a*) of the movable panel (12), the second seal portion (27) is configured to liquid-tightly contact the opening end (11*a*) of the opening portion (11), and the first turned back portion (26*c*) is positioned at a level higher than the second turned back portion (27*c*).

The roof apparatus includes the movable panel (12) moving upward and downward relative to an opening portion (11) formed on a roof portion (10) of a vehicle for opening and closing the opening portion (11), the weather strip (21) retained at a retaining member (14) provided at the roof portion (10), the cooperating member (50, 60) moving upward and downward in a vehicle height direction in response to an upward and downward operation of the movable panel (12) to protrude and retract through a clearance between a peripheral rim end (12*a*) of the movable panel (12) and the retaining member (14), and the weather strip (21) including a portion (24) to be retained being retained by the retaining member (14), a first seal portion (26) which is connected to an upper end of the portion (24) to be retained and liquid-tightly contacts the peripheral rim end (12*a*) of the movable panel (12) in a state where the movable panel (12) is in a fully closed state, and a second seal portion (27) which is connected to an upper end of the portion (24) to be retained and liquid-tightly contacts an opening end (11*a*) of the opening portion (11) in the state where the movable panel (12) is in the fully closed state. The first seal portion (26) is connected to a lower end portion of the portion (24) to be retained, a thickness of the first seal portion (26) gradually reduces from a first end portion (26*a*) positioned at an upper end side of the portion (24) to be retained towards a first turned back portion (26*c*) provided facing the peripheral rim end (12*a*) of the movable panel (12), the thickness of the first seal portion (26) gradually increases from the first turned back portion (26*c*) towards a second end portion (26*d*) provided at a lower end portion of the portion (24) to be retained, a thickness of the second end portion (26*d*) is set to be smaller than a thickness of the first end portion (26*a*), and a distance in a vehicle height direction from a lower end of the first seal portion (26) to the first turned back portion (26*c*) is set to be greater than a distance in the vehicle height direction from an upper end of the first seal portion (26) to the first turned back portion (26*c*). The second seal portion (27) is connected to a lower end of the portion (24) to be retained, a thickness of the second seal portion (27) reduces from a third end portion (27*a*) provided at an upper end of the portion (24) to be retained towards a second turned back portion (27*c*) provided facing the opening end (11*a*) of the opening portion (11), a thickness of a fourth end portion (27*d*) provided at a lower end of the portion (24) to be retained is set to be smaller than a thickness of the third end portion (27*a*), a distance (L22) in a height direction from a lower end of the second seal portion (27) to the second turned back portion (27*c*) is set to be greater than a distance (L21) in a height direction from an upper end of the second seal portion (27) to the second turned back portion (27*c*). The first turned back portion (26*c*) is positioned at a level higher than the second turned back portion (27*c*) in a vehicle height direction.

According to the construction of the disclosure, the first turned back portion (first looped portion 26*c*) is positioned at a higher level than the second turned back portion (second looped portion 27*c*) in the vehicle height direction. Generally, in the vehicle height direction, the length of the roof portion is longer than the movable panel (12) provided facing the weather strip (21). Further, it is favorable to reduce the distance between an upper end portion of a contact surface of the roof portion which contacts the weather strip and an upper end portion of a contact surface of the movable panel which contacts the weather strip in the vehicle height direction in order to reduce a difference in levels between the movable panel and the roof portion when the movable panel is in a closed state. That is, in the vehicle height direction, a lower end portion of the contact surface of the roof portion which contacts the weather strip is positioned at a lower level than a lower end portion of the contact surface of the movable panel which contacts the weather strip in the vehicle height direction. According to the foregoing construction, by positioning the first turned back portion (first looped portion 26*c*) to be at the higher level compared to the second turned back portion (second looped portion 27*c*) in the vehicle height direction, the first turned back portion (first looped portion 26*c*) and the second turned back portion (second looped portion 27*c*) can be positioned at each of center positions of the contact surface of the roof portion relative to the weather strip and the contact surface of the roof portion relative to the weather strip, respectively, in the vehicle height direction. Accordingly, first, the weather strip comes to contact with the center position of the contact surface of the roof portion relative to the weather strip and with the center position of the contact surface of the roof portion relative to the weather strip in the vehicle height direction, then a contact portion increases in upward and downward directions in the vehicle height direction, thus the sealing can be performed more liquid-tightly.

According to the disclosure, the roof apparatus which allows smooth elastic deformation of the weather strip when the cooperating member protrudes upward in response to the upward portion of the movable panel can be obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus comprising:
a movable panel moving upward and downward relative to an opening portion formed on a roof portion of a vehicle for opening and closing the opening portion;
a weather strip retained at a retaining member provided at the roof portion;
a cooperating member moving upward and downward in a vehicle height direction in response to an upward and downward operation of the movable panel to protrude and retract through a clearance between a peripheral rim end of the movable panel and the retaining member;
the weather strip including a portion to be retained being retained by the retaining member, a first seal portion which is connected to an upper end of the portion to be retained and liquid-tightly contacts the peripheral rim end of the movable panel in a state where the movable panel is in a fully closed state, and a second seal portion which is connected to an upper end of the portion to be retained and liquid-tightly contacts an opening end of the opening portion in the state where the movable panel is in the fully closed state; wherein
the first seal portion is connected to a lower end portion of the portion to be retained, a thickness of the first seal portion gradually reduces from a first end portion positioned at an upper end side of the portion to be retained towards a first turned back portion provided facing the peripheral rim end of the movable panel, the thickness of the first seal portion gradually increases from the first turned back portion towards a second end portion provided at a lower end portion of the portion to be retained, a thickness of the second end portion is set to be smaller than a thickness of the first end portion, and a distance in a vehicle height direction from a lower end of the first seal portion to the first turned back portion is set to be greater than a distance in the vehicle height direction from an upper end of the first seal portion to the first turned back portion.

2. The roof apparatus according to claim 1, wherein an edge which is provided at an upper end portion of the portion to be retained connected to the first seal portion and provided facing the peripheral rim end of the movable panel, is positioned closer to the opening end of the opening portion compared to an end which is provided at a lower end portion of the portion to be retained connected to the first seal portion and provided facing the peripheral rim end of the movable panel.

3. The roof apparatus according to claim 1, wherein
the portion to be retained includes a fitting portion including a pair of projection portions sandwiching a vertical wall portion of the retaining member, the vertical wall portion having a side facing the peripheral rim end of the movable panel and a side facing the opening end of the opening portion; and
a lower end portion of the portion to be retained is connected to the first seal portion and is positioned closer to the opening end of the opening portion compared to an edge of the fitting portion facing the peripheral rim end of the movable panel.

4. The roof apparatus according to claim 1, wherein
the second seal portion is connected to a lower end of the portion to be retained, a thickness of the second seal portion gradually reduces from a third end portion provided at an upper end side of the portion to be retained towards a second turned back portion provided facing the opening end of the opening portion;
the second seal portion is bent to protrude a portion provided between a fourth end portion provided at a lower end of the portion to be retained and the second turned back portion in a downward direction;
a thickness of the fourth end portion is set to be smaller than a thickness of the third end portion;
a distance in a vehicle height direction from a lower end of the second seal portion to the second turned back portion is set to be greater than a distance in a height direction from an upper end of the second seal portion to the second turned back portion; and
an edge which is provided at an upper end of the portion to be retained connected to the second seal portion and provided facing the opening end of the opening portion is positioned closer to the peripheral rim end of the movable panel compared to an end which is provided at a lower end of the portion to be retained connected to the second seal portion and provided facing the opening end of the opening portion.

5. The roof apparatus according to claim 1, wherein the weather strip corresponds to a pair of side-portion weather strips provided at vehicle-width-direction rim portions of the roof portion positioned opposite to each other, the roof apparatus, further comprising:
a pair of front/rear portion weather strips extending in a vehicle width direction, connecting front ends of the side-portion weather strips, and connecting rear ends of the side-portion weather strips via corner portions, respectively;
the front/rear portion weather strip including a portion to be retained for front/rear portion made from a resin member and retained by a front/rear portion retaining member provided at the roof portion, and a first front/rear portion seal portion and a second front/rear portion seal portion each made from a sealing member which is softer than the resin member that the portion to be retained for front/rear portion is made from, the first front/rear portion seal portion and the second front/rear portion seal portion being connected to a top end of the portion to be retained for front/rear portion, the first front/rear portion seal portion and the second front/rear portion seal portion liquid-tightly contacting the peripheral rim end of the movable panel and the opening end of the opening portion, respectively, when the movable panel is fully closed; wherein
the first front/rear portion seal portion is connected to a lower end portion of the portion to be retained for front/rear portion, a thickness of the front/rear portion seal portion gradually reduces from a first front/rear portion end portion provided at an upper end of the portion to be retained for front/rear portion towards a first front/rear portion turned back portion provided facing the peripheral rim end of the movable panel, the thickness of the first front/rear portion seal portion gradually increases from the first front/rear portion turned back portion towards a second front/rear portion end portion provided at a lower end portion of the portion to be retained for front/rear portion, a thickness of the second front/rear portion end portion is set to be smaller than a thickness of the first front/rear portion end portion, and a distance in a vehicle height direction from a lower end of the first front/rear portion seal portion to the first front/rear portion turned back portion is set to be greater than a distance in a vehicle height direction from an upper end of the first front/rear portion seal portion to the first front/rear portion turned back portion;

the second front/rear portion seal portion is connected to a lower end of the portion to be retained for front/rear portion, a thickness of the second front/rear portion seal portion gradually reduces from a third front/rear portion end portion provided at an upper end of the portion to be retained for front/rear portion towards a second front/rear portion turned back portion provided facing the opening end of the opening portion, the second front/rear portion seal portion is bent so that a portion provided between the second front/rear portion turned back portion and a fourth front/rear portion end portion provided at a lower end of portion to be retained for front/rear portion protrudes downward, a thickness of the fourth front/rear portion end portion is set to be smaller than a thickness of the third front/rear portion end portion, a distance in a vehicle height direction from a lower end of the second front/rear portions seal portion to the second front/rear portion turned back portion is set to be greater than a distance in a vehicle height direction from an upper end of the second front/rear portion seal portion to the second front/rear portion turned back portion; and an edge provided at an upper end of the portion to be retained for front/rear portion connected to the second front/rear portion seal portion, and provided facing the opening end of the opening portion is positioned closer to the peripheral end rim of the movable panel compared to an edge provided at a lower end of the portion to be retained for front/rear portion connected to the second front/rear portion seal portion and provided facing the opening end of the opening portion.

6. The roof apparatus according to claim 5, wherein the portion to be retained for front/rear portion includes a front/rear portion fitting portion sandwiching a vertical wall portion of the front/rear portion retaining member at a side facing the peripheral rim end of the movable panel and at a side facing the opening end of the opening portion, and at least one lip portion configured to be engaged with the vertical wall portion of the front/rear portion retaining member.

7. The roof apparatus according to claim 4, wherein the first seal portion is configured to liquid-tightly contact the peripheral end rim of the movable panel, the second seal portion is configured to liquid-tightly contact the opening end of the opening portion, and the first turned back portion is positioned at a level higher than the second turned back portion.

8. A roof apparatus comprising:
a movable panel moving upward and downward relative to an opening portion formed on a roof portion of a vehicle for opening and closing the opening portion;
a weather strip retained at a retaining member provided at the roof portion;
a cooperating member moving upward and downward in a vehicle height direction in response to an upward and downward operation of the movable panel to protrude and retract through a clearance between a peripheral rim end of the movable panel and the retaining member;
the weather strip including a portion to be retained being retained by the retaining member, a first seal portion which is connected to an upper end of the portion to be retained and liquid-tightly contacts the peripheral rim end of the movable panel in a state where the movable panel is in a fully closed state, and a second seal portion which is connected to an upper end of the portion to be retained and liquid-tightly contacts an opening end of the opening portion in the state where the movable panel is in the fully closed state; wherein
the first seal portion is connected to a lower end portion of the portion to be retained, a thickness of the first seal portion gradually reduces from a first end portion positioned at an upper end side of the portion to be retained towards a first turned back portion provided facing the peripheral rim end of the movable panel, the thickness of the first seal portion gradually increases from the first turned back portion towards a second end portion provided at a lower end portion of the portion to be retained, a thickness of the second end portion is set to be smaller than a thickness of the first end portion, and a distance in a vehicle height direction from a lower end of the first seal portion to the first turned back portion is set to be greater than a distance in the vehicle height direction from an upper end of the first seal portion to the first turned back portion;
the second seal portion is connected to a lower end of the portion to be retained, a thickness of the second seal portion reduces from a third end portion provided at an upper end of the portion to be retained towards a second turned back portion provided facing the opening end of the opening portion, a thickness of a fourth end portion provided at a lower end of the portion to be retained is set to be smaller than a thickness of the third end portion, a distance in a height direction from a lower end of the second seal portion to the second turned back portion is set to be greater than a distance in a height direction from an upper end of the second seal portion to the second turned back portion; and
the first turned back portion is positioned at a level higher than the second turned back portion in a vehicle height direction.

* * * * *